(12) United States Patent
Wine

(10) Patent No.: US 6,434,319 B1
(45) Date of Patent: Aug. 13, 2002

(54) DIGITAL VIDEO TAPE RECORDER FOR DIGITAL HDTV

(75) Inventor: Charles Martin Wine, Princeton, NJ (US)

(73) Assignee: Thomson Licensing S.A., Boulogne (FR)

(*) Notice: Subject to any disclaimer, the term of this patent is extended or adjusted under 35 U.S.C. 154(b) by 0 days.

(21) Appl. No.: 08/481,408

(22) PCT Filed: Jan. 29, 1994

(86) PCT No.: PCT/US94/00739
§ 371 (c)(1),
(2), (4) Date: Jul. 10, 1995

(87) PCT Pub. No.: WO94/17631
PCT Pub. Date: Aug. 4, 1994

(51) Int. Cl.$^7$ .......................... H04N 5/76; H04N 5/782
(52) U.S. Cl. ........................... 386/46; 386/91
(58) Field of Search ................ 358/335, 342, 358/310, 341, 343, 312; 360/10.1, 10.3, 32, 33.1; 348/384; 386/46, 83, 1, 68, 67, 81; H04N 5/76, 5/782

(56) References Cited

U.S. PATENT DOCUMENTS

| | | | | |
|---|---|---|---|---|
| 4,539,711 A | * | 9/1985 | Harger | 455/166 |
| 5,157,511 A | | 10/1992 | Kawai et al. | 358/335 |
| 5,168,356 A | | 12/1992 | Acampora et al. | 358/133 |
| 5,175,631 A | | 12/1992 | Juri et al. | 358/335 |
| 5,239,308 A | | 8/1993 | Keesen | |
| 5,282,049 A | * | 1/1994 | Hatakenaka et al. | 386/68 |
| 5,377,051 A | | 12/1994 | Lane et al. | 360/33.1 |
| 5,594,552 A | * | 1/1997 | Fujinami et al. | 386/131 |
| 5,657,414 A | * | 8/1997 | Lett et al. | 386/83 |

FOREIGN PATENT DOCUMENTS

| | | | |
|---|---|---|---|
| EP | 367 264 A2 | 5/1990 | H04N/9/82 |
| EP | 0 367 264 | 5/1990 | H04N/9/82 |
| EP | 396 285 A2 | 11/1990 | H04N/5/92 |
| EP | 469 842 A2 | 2/1992 | H04N/5/782 |
| EP | 482 888 A2 | 4/1992 | H04N/5/92 |
| EP | 505 985 A2 | 9/1992 | H04N/5/92 |
| EP | 517 141 A2 | 12/1992 | H04N/7/133 |
| JP | 02072780 | 3/1990 | H04N/7/137 |
| WO | WO 91/024300 | 2/1991 | H04N/7/133 |

* cited by examiner

Primary Examiner—Robert Chevalier
(74) Attorney, Agent, or Firm—Joseph S. Tripoli; Joseph J. Laks; Ronald H. Kurdyla

(57) ABSTRACT

A digital video tape record/playback apparatus (FIG. 10) for processing a high definition television signal includes provision for controlling the occurrence of high priority (HP) image information. Such information is selectively recorded at normal speed in tape tracks within predetermined regions (HP1–HP5) so as to appear along a tape head scanning path associate with predetermined tape playback speeds greater than normal (e.g., 20× normal). Input high priority data cells may be reordered or duplicated for recording in the predetermined tape regions in other than received order. In either case, the input datastream is massaged to produce a viewable image in a fast playback mode. In an illustrated system for receiving an MPEG coded datastream, an output datastream at greater than normal playback speed comprises either intracoded I-frame data cells only, or a whole Group of Pictures (GOP).

5 Claims, 15 Drawing Sheets

| FRAME TYPE | I | B | B | P | B | B | P | B | B | I | B | B | P | B | B | P | B | B |
|---|---|---|---|---|---|---|---|---|---|---|---|---|---|---|---|---|---|---|
| TRANSMISSION ORDER | 0 | -2 | -1 | 3 | 1 | 2 | 6 | 4 | 5 | 9 | 7 | 8 | 12 | 10 | 11 | 15 | 13 | 14 |
| DISPLAYED FRAME | | | | | | | | | | 6 | 7 | 8 | 9 | 10 | 11 | 12 | 13 | 14 |
| GOING FORWARD | R3 | | | R6 | | | RM | | | • | | | | | | | | |
|  | R3 | | | R6 | | | RM | | | R | • | | | | | | | |
|  | R3 | | | R6 | | | RM | | | R | | • | | | | | | |
|  | | | | | | | | | | R | | | • | | | | | |
|  | | | | | | | | | | R | | | R | • | | | | |
|  | | | | | | | | | | R | | | R | | • | | | |
|  | | | | | | | | | | | | | • | | | | | |
| GOING BACKWARD | | | | | | | R | | | R | • | | | | | | | |
|  | | | | | | | R | | | R | | • | | | | | | |
|  | | | | | | | R | | | R | | | • | | | | | |
|  | | | | | | | | | | R | | | R | • | | | | |
|  | | | | | | | | | | R | | | R | | • | | | |
|  | | | | | | | | | | R | | | R | | | • | | |
|  | | | | | | | | | | R | | | R | | | RM | • | |
|  | | | | | | | | | | R | | | R | | | RM | | • |

LEGEND: • REQUESTED FRAME  R REQUIRED TO MAKE REQUESTED FRAME  RM REQUIRED, BUT ALREADY IN MEMORY  Rn REQUIRED TO MAKE FRAME n

FIG. 20

DIGITAL VIDEO TAPE RECORDER FOR DIGITAL HDTV

FIELD OF THE INVENTION

This invention is related to the field of digital video signal processing, and more particularly to processing a digital high definitition television signal by a digital video tape recording/reproducing system.

BACKGROUND OF THE INVENTION

Digital high definition television (HDTV) systems have recently been proposed. One such system, proposed by the Advanced Television Research Consortium and generally known as the AD-HDTV system, prioritizes and digitally processes a high definition television signal subjected to MPEG-like variable length coding. MPEG is a standardized coding format being established by the International Organization for Standardization. The standard is described in the document "Internation Organization for Standardization," ISO/IEC DIS 11172, CD 11172-1, CD 11172-2, CD 11172-3 Rev. 1, version of Jan. 21, 1992, Coding for Motion Pictures and Associated Audio for Digital Storage Media, which document is incorporated herein by reference for description of the general code format. Aspects of the AD-HDTV system are described in U.S. Pat. No. 5,168,356-Acampora et al. In the system described by Acampora, codewords are prioritized to reflect high priority and relatively lower priority standard priority information in a digital datastream. Codewords are formed into transport packets, or cells. Each transport packet includes a packed data payload section prefaced by a header which contains information identifying the associated payload data.

It is desirable to record and reproduce (playback) such a digital HDTV signal by means of a device such as a consumer video cassette recorder (VCR) for example. Such a device uses two or more magnetic heads mounted on the periphery of a rotating drum. The heads are physically separated by a predetermined amount, and record/reproduce a signal in alternate successive angled tracks on a magnetic tape. Both consumer and professional VCRs often include provision for special "trick" features such as variable speed forward (eg., fast search), reverse and freeze-frame. The disclosed recording/reproducing apparatus is capable of reproducing pre-recorded media, and can record both a received broadcast high definition television such as a signal in accordance with the AD-HDTV format, as well as live pictures from a camera. The present invention is directed to means for facilitating the operation of high definition digital video recorder/reproducing apparatus, with respect to special features operation in particular.

SUMMARY OF THE INVENTION

In accordance with the principles of the present invention, digital video tape recording/reproducing apparatus suitable for processing a high definition television signal includes provision for controlling the occurrence of high priority image information. Such information is selectively recorded at normal speed at predetermined regions on tape tracks so as to be appear along a tape head scanning path associated with specific reproducing speeds greater than normal (eg., 20× normal). Input high priority data may be reordered or duplicated for recording in predetermined tape regions. In either case, input data is manipulated to produce a viewable image during reproduction at higher than nominal reproduction speeds, eg., in a fast search mode. In an illustrated system for receiving an MPEG coded datastream, an output datastream at greater than normal reproduction speed comprises either intracoded I-frame data cells only, or a whole Groun of Pictures (GOP).

In accordance with a feature of the disclosed system, feature bits/indicators containing operating instructions for subsequent receiver circuits are added to the datastream.

In accordance with another feature of the disclosed system, information is processed at the MPEG codeword level. An input MPEG coded datastream is decoded to MPEG words, then selected MPEG words are re-coded and recorded in tape packets.

BRIEF DESCRIPTION OF THE DRAWINGS

In the drawing:

FIG. 20 is a table illustrating aspects of a slow features operating mode of a tape recording/reproducing system according to the invention.

DETAILED DESCRIPTION OF THE DRAWING

Figure 1:
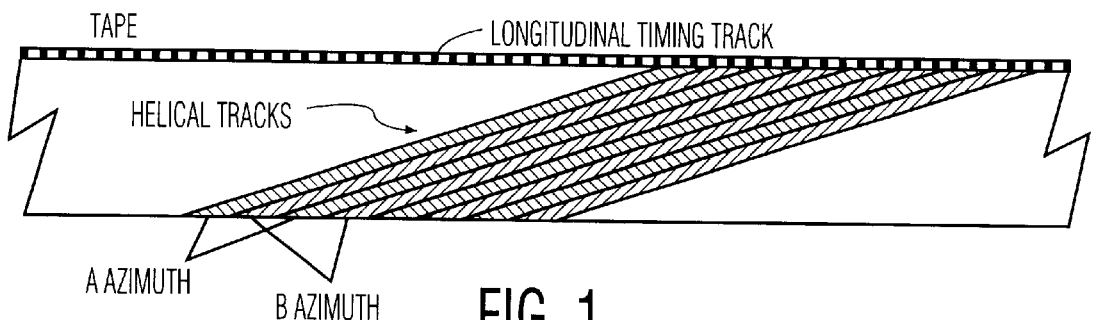
FIG. 1 illustrates a portion of a magnetic tape showing a helical tape recording format.

By way of background, and as an aid to understanding the operation of the invention, FIG. 1 shows a segment of magnetic tape recorded in conventional helical format. Helical-scan tape tracks are oriented at an angle as shown, and are alternatingly recorded at different azimuths, "a" and "b," in accordance with conventional practice. Also in accordance with conventional practice, longitudinal tracks disposed along an outer edge of the tape contain servo and timing information.

In normal VHS television format, each track encompasses one image field interval. In the case of the tape wrapping around the rotating drum 180 degrees, and with two recording/playback heads, the drum completes one revolution in two fields (1/30 second) at a drum speed of 1800 rpm. To obtain more bandwidth for digital recording, each field/frame may be segmented into five portions, for example. Such segmentation does not present a problem since data headers provide a reliable means of identifying data segments to be recombined into an image. In such a digital system the drum spins five times as fast (9000 rpm). This speed is assumed to be acceptable for accomodating a 35 Mbps (bits per second) gross data rate, or about 24 Mbps net video rate, eg., after error correction, control and audio data). Bandwidth. capacity may be further increased by increasing the number of tracks and associated heads. At 35 Mbps, each track contains 115 Kilobits or 14.5 KiloBytes. This amount of data is equivalent to about 100 transport packets in the AD-HDTV system. In a digital system, each track may contain more or less than a field/frame of information due to the nature of the variable length coded data associated with each transport packet.

Figure 2:
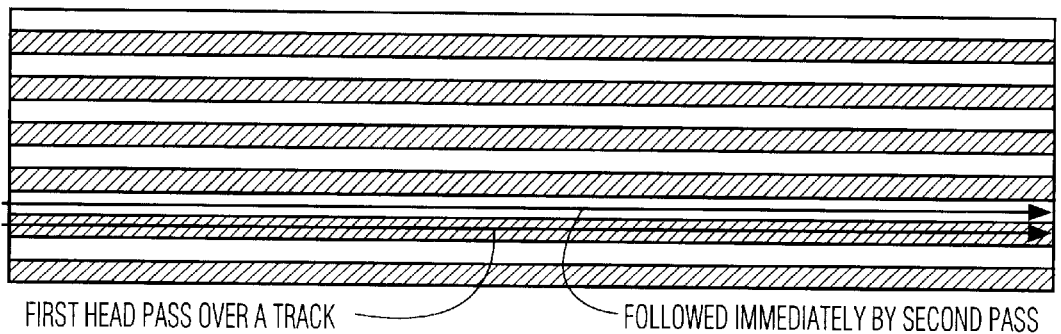
FIG. 2 illustrates the head scanning path of magnetic tape tracks during normal play.

Head gaps are skewed with respect to the direction of tape head motion by a few degrees, with alternate heads tilted in opposite direction, as is known (azimuth recording/reproducing). When recording, the tracks overlap so that the tape head is completely covered with abutting tracks. When reproducing at a normal speed, each head is centered on its associated track with the correct tilt and adjacent track signals are greatly attenuated by the effect of the azimuth and are thus effectively disregarded. This normal mode process is illustrated by FIG. 2, showing the paths taken by first and second heads over respective (white and shaded) tracks during successive passes of the respective heads.

Figure 3:
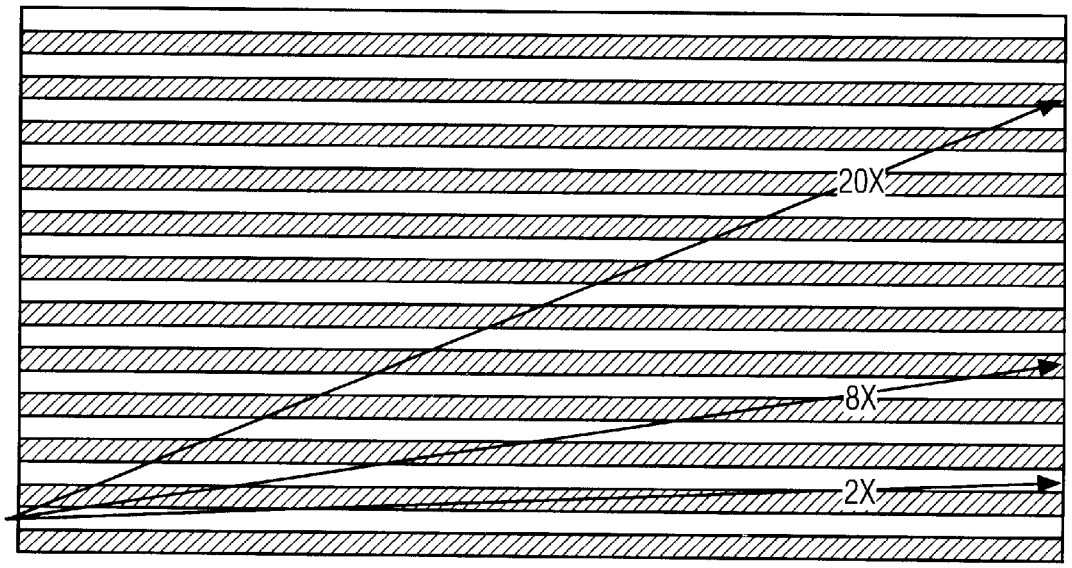
FIG. 3 illustrates the head scanning path of magnetic tape tracks in fast scan modes.
Figure 4:
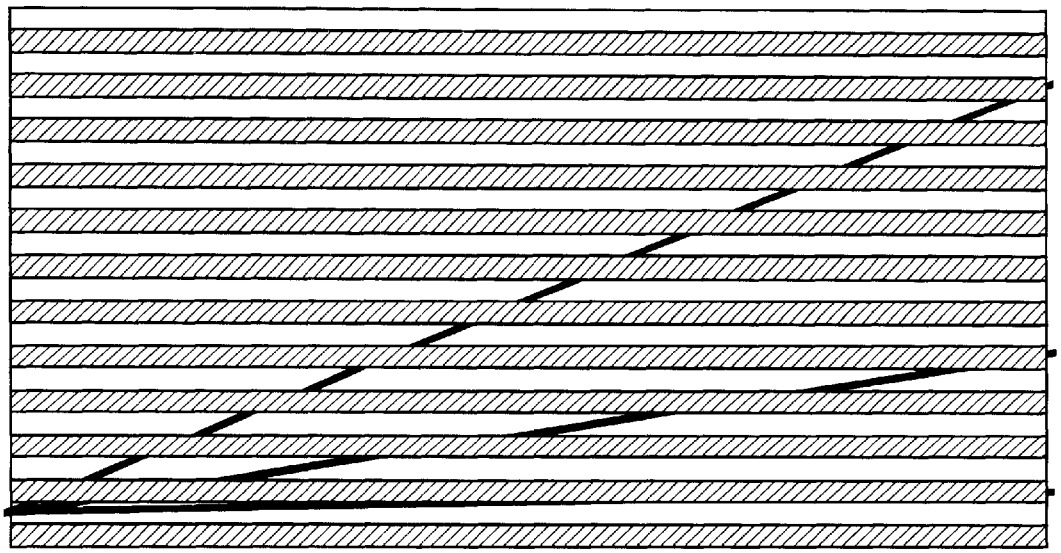
FIG. 4 illustrates data recovery areas in fast tape scan modes.

In a special "features" mode, such as fast search, each head passes across the tape at an angle to the recorded tracks. This process is illustrated in FIG. 3 for fast-search speeds 2×, 8× and 20× faster than normal. In effect, each head drifts across the tape tracks from one edge to the other at a rate that is a function of the tape speed. In the higher speed modes, data recovered by each head appears in the form of a burst of good data cells followed by a gap as the head passes over a track section recorded with the other azimuth angle, then a burst of good cells from somewhere else in the picture. In this regard it is noted that the likelihood of picture data continuity diminishes with increasing tape speed due to the increasing number of tracks crossed as the head transits the tape from edge to edge. The data disruption (gaps) produced by high speed tape operation is illustrated by FIG. 4. The data gaps are caused by the tape head skipping tracks rather than following a given track continuously as in the normal speed mode, coupled with the inability of a given head intended to operate with respect to a track recorded at one azimuth (shaded track) to recover data from an adjacent (white) track recorded at a different azimuth.

The fast search speed range is dictated by the ability to search the tape rapidly while obtaining a reasonable preview of a displayed picture. A speed range from about 10× to 30× normal generally satisfies this objective. At slower speeds, a viewer may become impatient. The high end of this speed range may be too fast for skipping television commercials, for example, but would still be useful for searching a tape.

Fast features are distinguished by the fact that the head cannot cover all of the tape area, whereby only a portion of the available data becomes available for display. In accordance with the principles of the present invention, it is recognized that this deficiency may be significantly compensated for by managing the data so as to determine which data subset on the tape becomes available for display at one or more predetermined tape speeds. To this end certain data cells are massaged, eg., duplicated or re-ordered, to permit reproduction from the tape in a desired temporal sequence at predetermined tape speeds. Specifically, high priority data are positioned on the tape so as to be reproducibly scanned by the head at selected tape speeds. This process is facilitated by the packetized datastream, and in particular by indentifying and timing information contained in the headers associated with the data packets, as will be explained in connection with subsequent Figures. In the AD-HDTV system HP cells contain the most important information required to reproduce the picture. The HP cells are treated in a manner which minimizes the chances of the information being lost. In over-the-air transmission the HP information is sent at a higher power level than the LP information. For tape recording, it may be advantageous to record the HP cells more than once.

Figure 5:
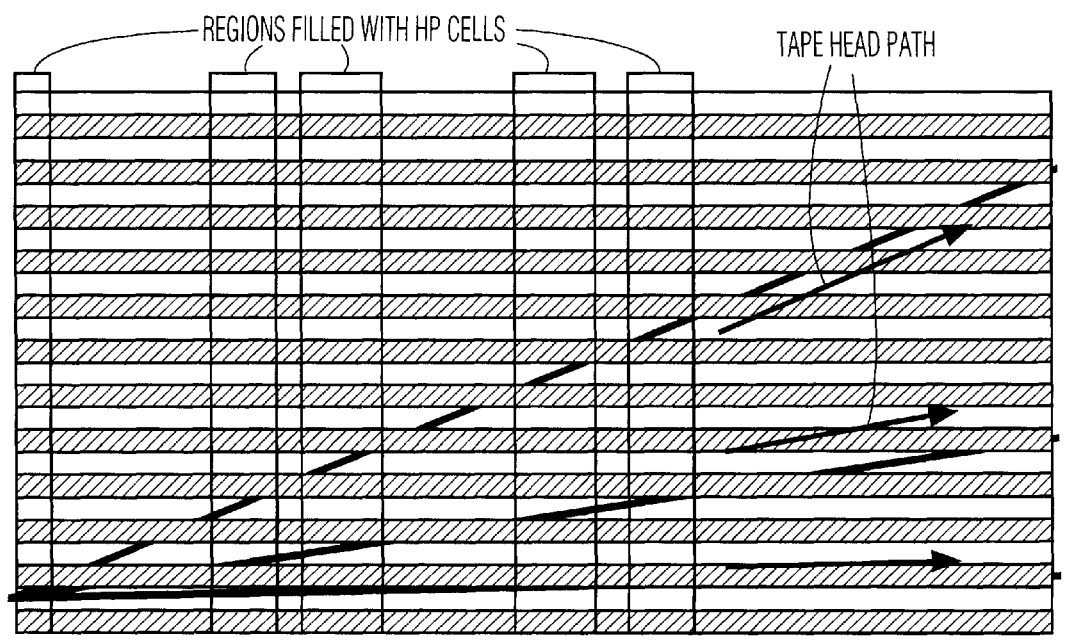
FIGS. 5 and 6 illustrate the recorded position of high priority (HP) information for fast scan reproduction in accordance with the present invention.

Since at high tape scanning speeds the reproduced/displayed information is otherwise unpredictable, in the disclosed system certain high priority information which is known to produce a good image is recorded at specific track locations which are traversed by the head at selected tape speeds. This high priority information includes low video frequencies including DC, important AC image information, audio and synchronizing information, for example. This recorded data format is illustrated by FIG. 6, which is derived from FIG. 5.

One function of the HP information is synchronization of the data presentation with the arrival of data in the bitstream. The video input to the system arrives as pictures or frames that occur at constant rate. The encoding process produces a variable length coded bitstream in which individual frames occupy different numbers of bits, and hence different time intervals. The receiver must produce video output frames at constant rate. In addition, the decoder must have all of the input bits required to generate an output frame at the time that the bits are needed. In the AD-HDTV system, timing packets in the HP channel are used, in conjunction with the picture header information in the bit stream to achieve the desired synchronization. The picture header information in the bit stream occurs in the HP data cells at the beginning of the data for each frame. These picture headers include an indentifier for the picture sequence number. This picture header sequence number is, in effect, a count, going from 0 to 1023 of frames in the video sequence. Picture (or frame) 123 follows picture 122 and is followed by picture 124. The picture header information can be thought of as conveying the meaning: "The following bits determine how to make frame 123." The timing cells in the HP channel are inserted by the encoder at approximately a constant rate, the display frame rate. The timing cells do not align with the picture data. When each timing cell arrives, it is time for the decoder to make an output picture. The timing cells contain a sequence number that corresponds to the picture that is to be made. At some time, a timing cell arrives, containing a sequence number 122, indicating that frame 122 is to be made. Very nearly one frame time later, a timing cell arrives containing sequence number 123, indicating that frame 123 is to be made. The time of arrival of the timing cell indicates when the frame is to be generated, and the contents of the timing cell indicates which frame is to be made. If the data for frame 123 arrives before the timing cell for frame 123, the decoder waits for the proper timing cell. If the timing cell for cell 123 arrives at the decoder and the buffer in the decoder contains something other than the picture header for cell 123, the data in the buffer is discarded. This recorded data format is illustrated by FIG. 6, which is derived from FIG. 5. The timing cell information can be thought of as conveying the meaning: "Now is the time to make frame 123."

Additional redundant information is carried in the timing cell, such as the type of frame (I,B or P). The timing cell is also the vehicle for transmitting the decoder control bits or feature bits described below.

Figure 6:
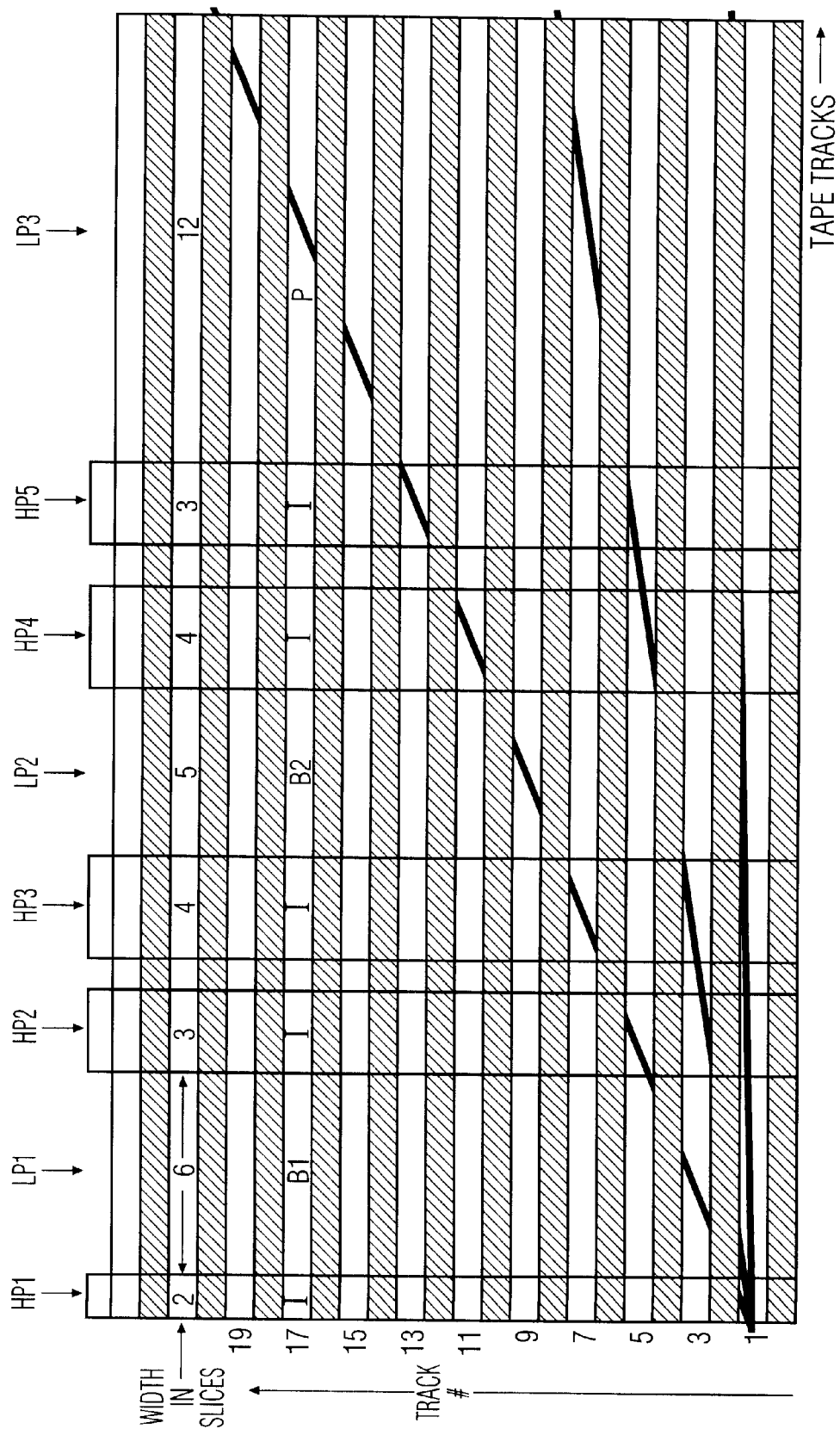

As shown in FIG. 6, high priority (HP) data packets (cells) are recorded at five predetermined regions of a track, designated as HP1 through HP5. The track sections passed by the head during non-standard speed playback (eg., fast search) determine the recorded locations of HP data. HP data is spatially recorded along the track to facilitate recovery during other than nominal reproduction speeds when the head traverses multiple recorded tracks during a single pass.

The HP data packets are located so that they encompass all of the tape track segments within each designated HP region, not only the black areas within each HP region. The black areas indicate the head contact areas along the head path at predetermined 2×, 8× and 20× normal tape speeds (see FIG. 3), ie., areas where the head acquires information from the tape at these predetermined speeds. The remaining intervening regions containing head contact areas are considered as low priority (LP) regions and are designated as regions LP1 through LP3 for the 20× normal speed example. Other low priority regions, eg., between regions HP2, HP3 and between regions HP4, HP5 have not been labelled as such. Low priority data is written to the tape as it appears in the original input datastream, ie., without re-ordering.

The following discussion is made with respect to tape speed at 20× normal speed. In the AD-HDTV system, HP information includes low frequency video information and audio and synchronizing (timing) information. In the present embodiment, the HP regions are filled with re-ordered intracoded I-frame cell data, and the LP regions arbitrarily contain B frame or P frame cell data among other low priority information as received. It is noted that the HP regions are selected so that good results are produced at more than one speed, ie., HP data is predicatably recovered at these speeds. Specifically, each of the three illustrated tape speeds (2×8× and 20× normal) will have HP information recorded to coincide with the associated head path so that a viewable or recognizable image will be produced by a head following each of the associated paths. For example, the uppermost 20× speed path includes five designated HP regions (including one at the origin), each of which has a counterpart at the other designated high tape speeds. In FIG. 6, the numbers shown in the third horizontal track from the top designate the nominal width of the associated HP or LP region, in data slices. Thus, for example, region HP1 contains 2 high priority data slices, region LP1 contains 6 low priority data slices, region HP2 comprises 3 data slices, and so on. It is to be understood that these slice designations are a simplification in the interest of providing a clear explanation. The HP data is recorded at normal tape speed so that this data is traversed by the head at the selected fast forward features speeds, as will be discussed inconnection with FIG. 7.

In the recording process, the variable-length-encoded bitstream is put onto the tape. An example not involving duplication of data will be described first. The total bit rate to be recorded corresponds to the total area of tape to be recorded. In previous recording methods, the data to be recorded is put on the tape sequentially. In the current example, there is no direct correspondence of the position of the data on the tape to the time sequence of the video. The bitstream data is rearranged, cell by cell, to provide the feature mode playback. A desired pattern of cells on the tracks is pre-determined, based on the desired playback feature speeds. As shown in FIG. 6, the planned pattern is: 2 HP cells, 6 SP cells, 3 HP cells, 1 SP cell, 4 HP cells, 5 SP cells, 4 HP cells, 2 SP cells, 3 HP cells and 12 LP cells. The corresponding sequential regions in FIG. 6 are marked HP, LP1, HP2, (LP not-marked), HP3, LP2, HP4, (LP not-marked), HP5, and LP3. The tape regions are filled with the next available cell of the corresponding type that is available in the prioritized bitstreams. In normal playback, the full data stream is recovered from the tape. The first 2 cells of a track go into the HP output stream, the next 6 cells go into the LP stream, the next 3 into HP, and so forth.

Again, with reference to FIG. 6, now assume that the same tape is played back at 2× speed. Valid data is read form the tape in the region marked in black. The reading process starts on track 1. The first 2 cells read are assigned to HP, the next 6 cells assigned to SP, the next 3 to HP, the next cell to SP and so forth. Somewhere in region LP3 the data becomes invalid. Valid data resumes with the other azimuth head on track 4, and repeats the same pattern. It can be seen that not all of the data is recovered, but the data that was lost was LP data. It is a characteristic of the prioritization of AD-HDTV that pictures can be generated from HP data only.

Figure 7:
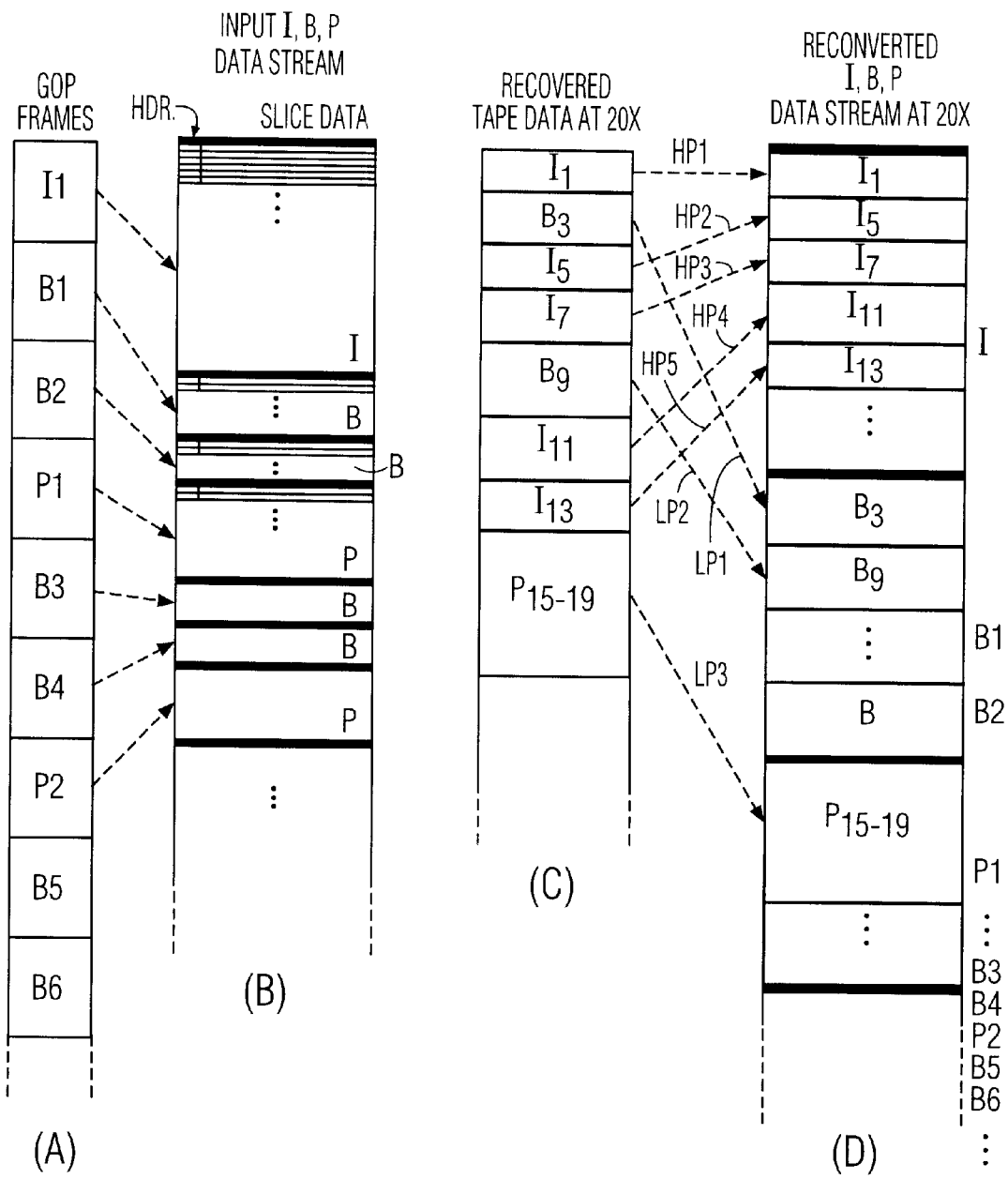
FIG. 7 illustrates the relationship between picture, datastream and magnetic tape information in a fast forward features mode, in the context of FIG. 6.

FIG. 7 illustrates the process of tape machine operation in a fast forward features mode at 20× normal speed, with respect to cell data reordered into a desired sequence of HP and LP data regions as shown in FIG. 6. For the purpose of the following example it is assumed that the reordered data placed in HP regions HP1 through HP5 is MPEG intraframe coded I-frame data, which is temporally coherent information independent of other information, unlike B-frame or P-frame data which are predictively coded. To simplify the following discussion of FIGS. 6 and 7, it is assumed that low priority LP regions LP1, LP2 and LP3 respectively contain $B_1$, $B_2$ and $P_1$ frame data in that order, although the actual content of the LP regions would be arbitrary, ie., the LP data would occur in the LP regions in the order received in the datastream.

Figure 8:
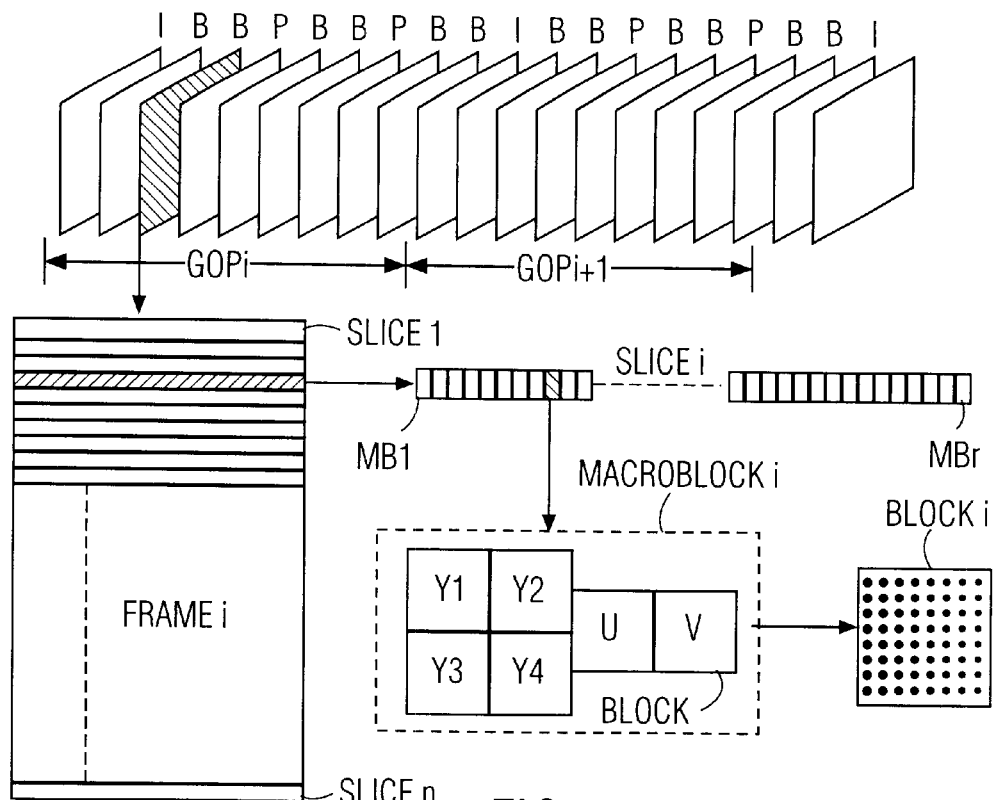
FIG. 8 is a representation of datablock groups consistent with the MPEG standard.
Figure 9:
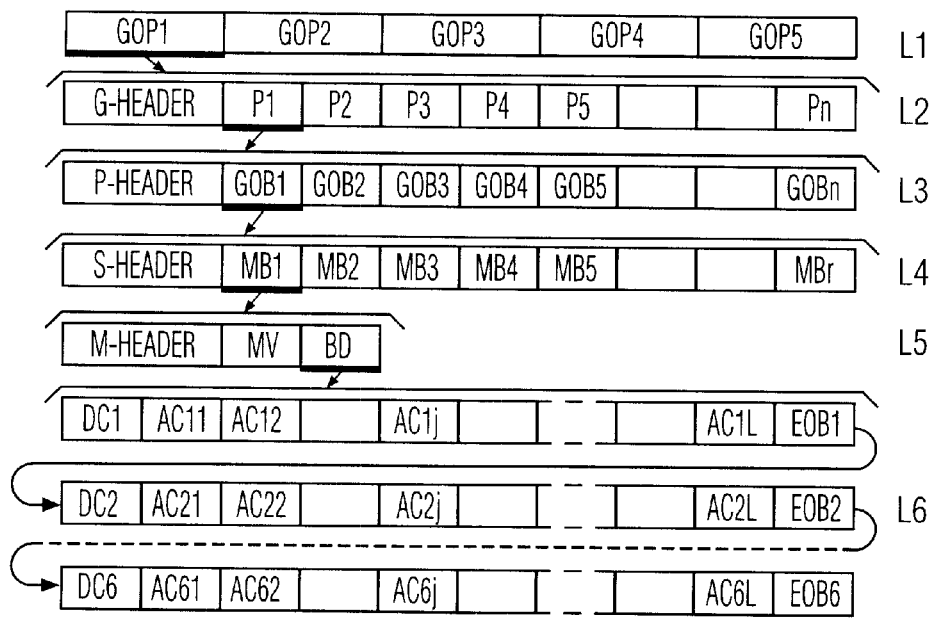
FIG. 9 is a generalized pictorial representation of a hierarchical data format consistent with the MPEG standard.

To help understand this material, reference is made to FIGS. 8 and 9 together with pictorial (A) of FIG. 7, showing the MPEG arrangement of a Group of Pictures (GOP). A GOP, in the context of the MPEG standard, contains 9 image frames, beginning with an I-frame followed by a sequence of B- and P-frames as follows: I, $B_1$, $B_2$, $P_1$, $B_3$, $B_4$, $P_2$, $B_5$, $B_6$. An I-frame usually requires many more bits than either B or P frames. A GOP exhibits a display time of 9/30 sec., or about 0.3 seconds. At a channel rate of 24 Mbps, an average GOP corresponds to 7.2 Mb in size (24×9/30). A GOP may vary in size from 1.2 Mb to 13.2 Mb. An AD-HDTV receiver typically will contain two stored past and future I and P anchor frames. When a B frame is received, an output image frame will be generated from the stored anchor frames. When a non-B frame is received, the existing future anchor frame is moved to the position of the past anchor frame, and a new future anchor frame is created from the received data while the past anchor frame is being displayed.

Figure 18:
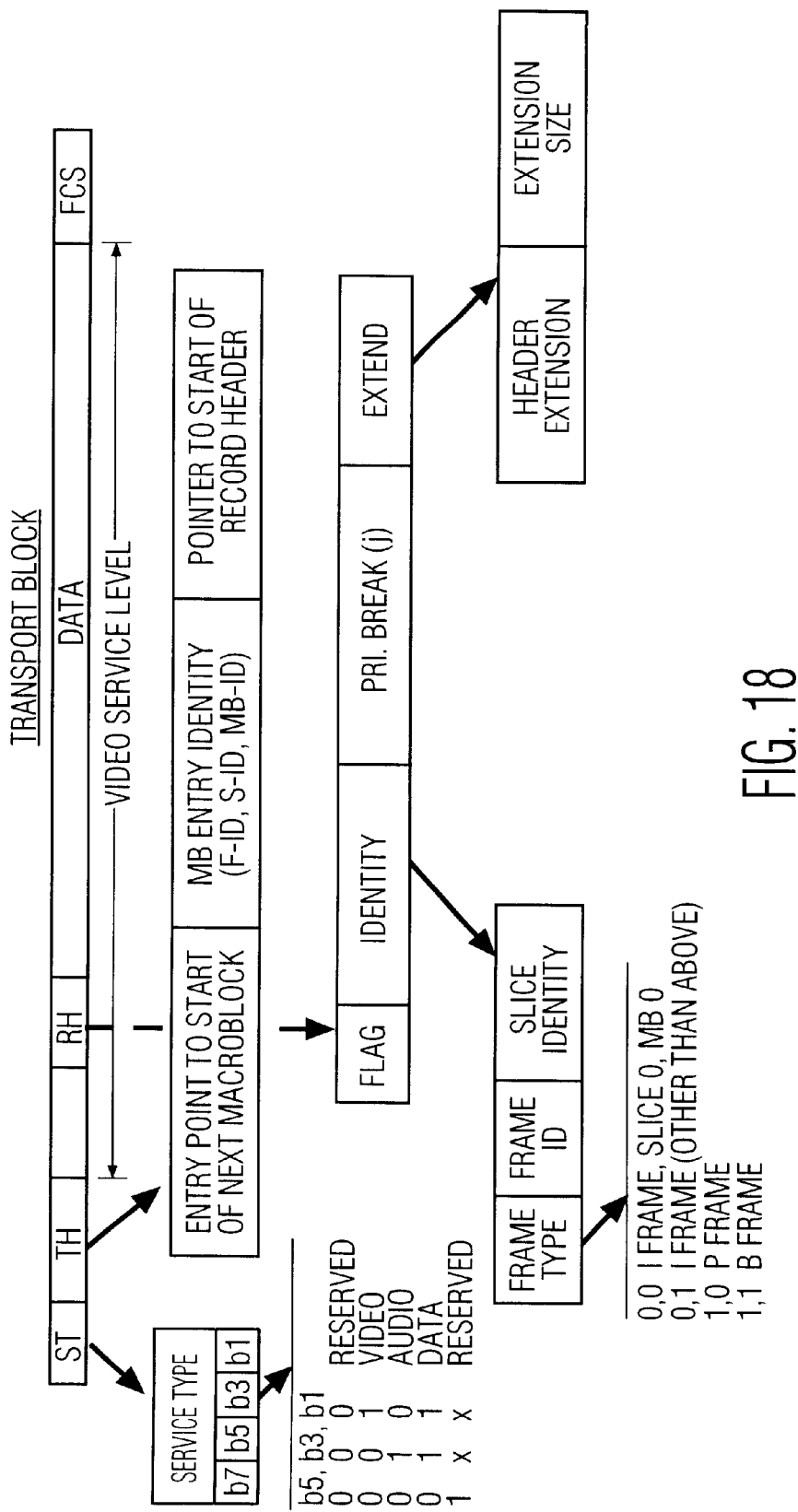
FIG. 18 shows details of a known transport block (packet) header component for the AD-HDTV system.
Figure 19:
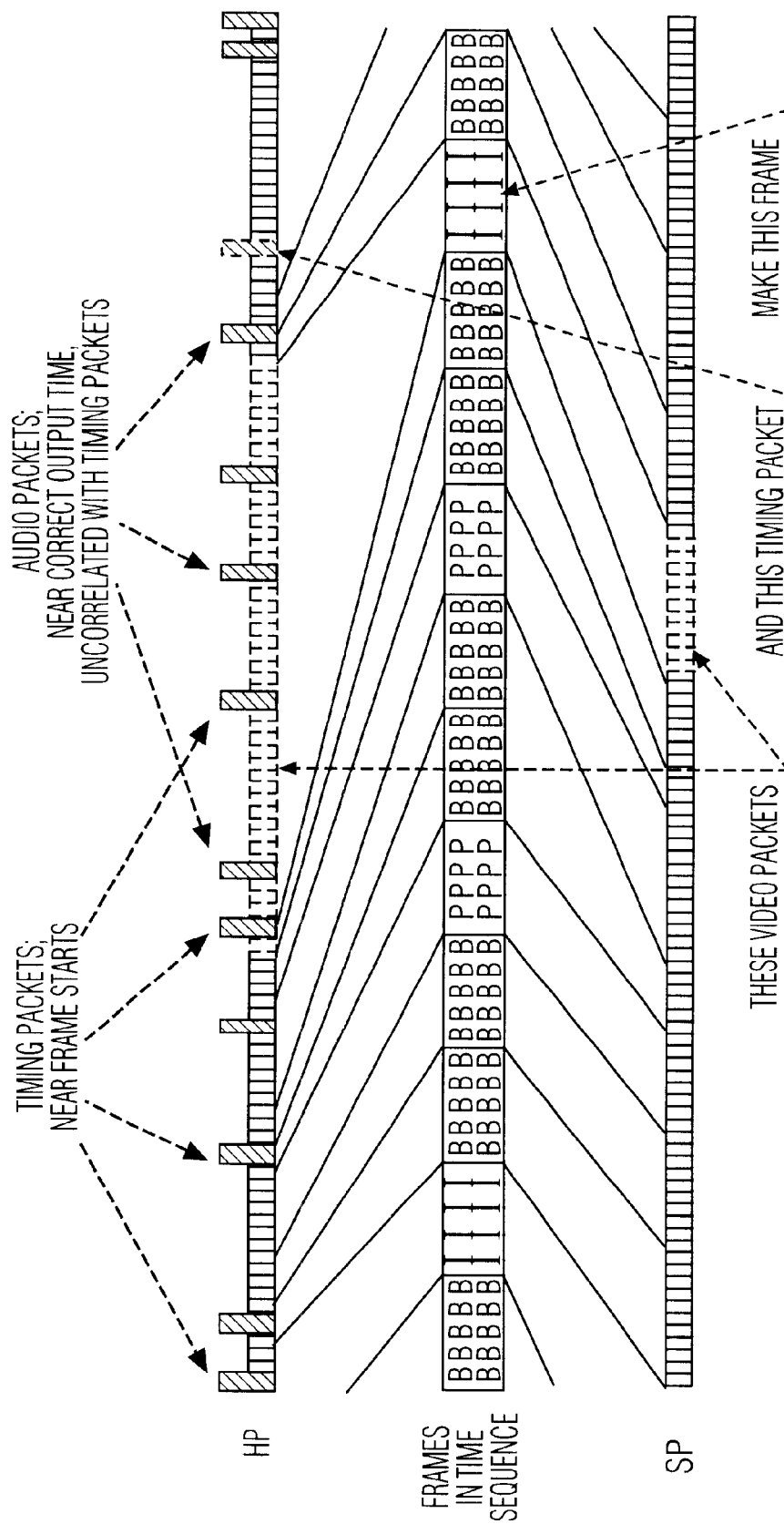
FIG. 19 illustrates the relationship between high priority (HP) and low/standard priority (SP) data channels in an HDTV system, and a picture frame sequence according to the MPEG standard.

More specifically, in this example the input datastream comprises a data-compressed sequence of frames that are coded compatible with the MPEG format. This format is hierarchical and is illustrated in abbreviated form in FIG. 9. The MPEG hierarchical format includes a plurality of layers each with respective header information. Nominally each header includes a start code, data related to the respective layer and provision for adding header extensions. Each header includes information related to the data in the data packet with which the header is associated. The header information aids data assembly and synchronization eg., at a receiver, and includes information such as service type (eg., audio, video), frame type, frame number and slice number, for example. A header of this type and its processing are described in the context of an AD-HDTV signal processing system employing MPEG signal coding in previously mentioned U.S. Pat. No. 5,168,356-Acampora et al. FIG. 18 of the present application shows details of the transport block header used in the AD-HDTV system described in the Acampora et al. patent. FIG. 19 shows the timing relationship between the AD-HDTV high priority (HP) and the relatively lower priority standard priority (SP) datastreams, and the time sequence of the MPEG coded I, B and P frames.

When referring to the MPEG compatible signal processed by the system, what is meant is that (a) successive picture fields/frames of video signals are encoded according to an I, P, B coding sequence, and (b) coded data at the picture level is encoded in MPEG compatible slices or group of blocks, where the number of slices per field/frame may differ and the number of macro blocks per slice may differ. An I coded frame is one which is intraframe compressed (coded) such that only I frame compressed data is required to reproduce an image. P coded frames are coded according to a forward motion compensated predictive method, where the P frame coded data is generated from the current frame and an I or P frame occurring before the current frame. B coded frames are coded according to a bidirectionally motion compensated predictive method. The B coded frame data is generated from the current frame and from I and P frames occurring both before and after the current frame.

The coded signal processed by the present system is segmented into groups of pictures (frames), or GOPs, illustrated by the row of boxes L2 (FIG. 9). Each GOP (L2) includes a header followed by picture data segments in the form of a sequence of nine picture frames I, B, B, P, B, B, P, B, B as illustrated by pictorial (A) of FIG. 7. The GOP header includes data related to the horizontal and vertical picture size, the aspect ratio, the field/frame rate, the bit rate and other information.

The picture data (L3) corresponding to respective picture frames includes a picture header followed by slice data (L4). The picture header includes a field/frame number and a picture code type. Each slice (L4) includes a slice header followed by a plurality of blocks of data MBi. The slice header includes a group number and a quantization parameter.

Each block MBi (L5) represents a macroblock and includes a header followed by motion vectors and coded coefficients. The MBi headers include a macroblock address, a macroblock type and a quantization parameter. The coded coefficients are illustrated in layer L6. Each macroblock includes 6 blocks, including four luminance blocks, one U chrominance block and one V chrominance block, as shown in FIG. 8. A block represents a matrix of pixels, e.g., 8×8, over which a discrete cosine transform (DCT) is performed in this example. The four luminance blocks are a 2×2 matrix of contiguous luminance blocks representing, e.g., a 16×16 pixel matrix. The chrominance (U and V) blocks represent the same total area as the four luminance blocks. That is, before compression the chrominance signal is subsampled by a factor of two horizontally and vertically relative to luminance. A slice of data corresponds to data representing a rectangular portion of an image corresponding to an area represented by a contiguous group of macroblocks. A frame may include a raster scan of 360 slices, 60 slices vertically by 6 slices horizontally. The block coefficients are DCT transformed one block at a time. The DC coefficient occurs first, followed by respective DCT AC coefficients in the order of their relative importance. An end-of-block code EOB is appended at the end of each successively occurring block of data.

Referring again to FIG. 7, pictorial (B) is a simplified expanded view of pictorial (A). Each I, B and P frame comprises image slices with a data component and a header component which defines the associated slice data component. Pictorial (C) represents the data recovered from the magnetic tape at 20× normal speed. Each segment of recorded data (C) represents a burst of about 6–7 data cells followed by a gap of about 3–4 data cells, at 20× normal speed. The recovered data is derived from a tape with data arranged into predetermined HP/LP regions as shown in FIG. 6. In the interest of clarity, pictorial (C) does not show the data gaps resulting as the head passes over other azimuth recorded tracks. Pictorial (D) illustrates the datastream at the output of the tape machine when playing back at 20× normal speed. The playback data (D) has been re-ordered and converted (from recorded data C) to the standard MPEG sequence of I, B, B, P . . . frames which a receiver's signal processing circuits expect to see for display processing purposes. Thus pictorial (D) represents image data in a fast forward features mode at 20× normal speed based upon an arrangement of the tape into HP and LP segments as shown in FIG. 6.

The tape data packets are reordered into prioritized regions as shown and discussed with respect to FIG. 6 by using information including timing information contained in the tape packet headers together with an indexing system as will be described. The recovered tape data sequence begins with I-frame information since this information begins a GOP according to the MPEG standard and is therefore readily identified. In addition, a Picture Start codeword is associated with the beginning of a GOP. Beginning with track 1 at 20× speed, the first recovered data from high priority region BP1 is I frame slice information which in pictorial (C) is shown as I1. The next region scanned by the tape head along the 20× speed path is a low priority region LP1 occurring at track 3. Data recovered from this region, assumed to be B frame data, is shown as $B_3$. The third region scanned by the tape head at 20× speed is high priority region HP3 at track 5. Data recovered from this region is shown as I5 in pictorial C This process continues by acquiring I frame data from tracks 7, 11 and 13, B frame data from track 9, and P frame data from tracks 15–19, in the sequence shown. In pictorial (C), the subscript associated with a given I, B or P frame designates the track from which the data was recovered by the head. The data recovered from the LP3 region of the tape corresponds to disconnectet regions of LP data from that is probably from somewhere in frames 15 through 19. Because of the nature of the variable-length-encoded bitstream, it is generally not possible to specifically indicate which frames of video correspond to specific regions of the tape.

The recovered data in pictorial (C) is inappropriate for processing by a receiver, since a receiver expects the see data in the I B B P B B P B B MPEG frame format. Thus the data recovered at 20× normal speed (pictorial C) must be re-converted back to an MPEG compatible datastream. Such a re-converted MPEG compatible datastream reflecting 20× tape operation is illustrated by pictorial (D) and is developed as follows. First, the tape packet headers of the recorded data in pictorial C are examined to identify the recovered information. The data is then re-ordered into the standard MPEG format by grouping I, B and P frame data together in sequence. The HP1–HP5 I frame data is placed first in sequence in the output datastream ($I_1, I_5, I_7, I_{11}, I_{13} \ldots$), followed by LP1 and LP2 B frame data ($B_3, B_9 \ldots$), other B frame data, and LP3 P frame data ($P_{15-19} \ldots$).

Figure 7A:
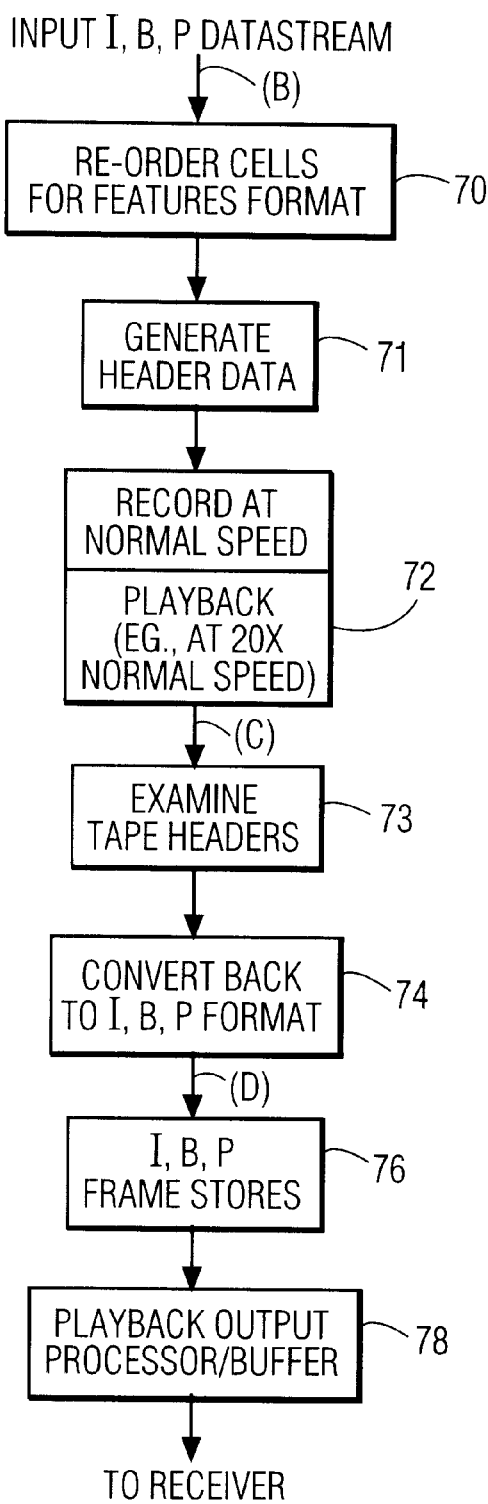
FIG. 7a is a block diagram generally illustrating functional aspects of the fast forward features mode described in connection with FIGS. 6 and 7.

FIG. 7A generally illustrates the process by which this is accomplished. In step 70, the input I, B, P datastream (pictorial B in FIG. 7) is reordered so that the data cells exhibit the sequence of high and low priority regions shown in FIG. 6. In step 71 tape packet header data is provided for identifying the reordered data. The reordered tape packets are recorded at normal speed, and played back at 20× normal speed in a features mode (step 72). During 20× playback the headers of the recorded packets are examined in step 73. These headers contain information identifying the I, B, P data sequence shown in pictorial (C) in FIG. 7. In step 74 the data sequence is converted back to the standard MPEG sequence expected by the receiver (pictorial D). The re-converted IBBP . . . frame sequence is stored in a multiple page (I, B, B, P) memory (step 76), which is continually scanned for deriving output data to be applied to a tape signal receiver via a playback output processor/buffer (step 78). Addresses in frame stores which have not been altered to reflect reordered data remain unchanged, ie., with old data from prior tape head scans.

At normal tape speed, all IPB frame data derives from one tape track, in contrast to the 20× normal speed situation where, for example, I frame data are obtained from more than one track. With the disclosed technique, reordered HP I frame data is advantageously placed so as to be predictably recovered at several places along the tape head path, at more than one tape speed in this example. A visual presentation in the illustrative I frame example is a series of still image information at a refresh rate likely to be about 3 to 5 frames a second. Each frame is composed of pieces (from macroblocks, through slices to larger pieces) from the corresponding collection interval.

The disclosed technique for remapping high priority cell data into predetermined tape regions for reproducible recovery during a high speed features mode essentially first involves determining what scan rates produce good results. Typically, a scan rate that is moderate (2, 3, or 4×) is desired to allow accelerated viewing of pictures. In addition, the fastest rate that produces viewable pictures is desired (eg., 20×) to permit rapid skipping of unwanted scenes. Next, the areas of the tape traversed by the head at these scan rates is mapped, ie., the head track is determined. Finally, HP cells are assigned (re-ordered) to designated tape areas traversed by the head at selected scan rates. A duplicate of a timing cell associated with the beginning of a GOP may be placed at the beginning of a tape scan, since there is a high probability of recovering such a cell. If HP cells do not completely fill selected areas, the cells are distributed in clumps in the centers of the selected areas. It is noted that, during fast scans, as the pickup head is displaced with respect to the position centered with respect to the track (of correct azimuth), the signal quality follows a trapezoidal shape. Specifically: the signal is not present, the signal improves, the signal is good while the head is aligned with the center of the track, the signal gets worse, and the signal is lost. The HP data is located in the regions where the signal is good. If the selected areas are large enough for the original number of cells, but not large enough to hold all the duplicate cells, the duplicates are distributed uniformly throughout the area. If the selected areas are too small for the original number of HP cells, the least useful scan rate should be ignored and the head track is remapped at the time of product design.

With this technique, the fraction of the image which is visually good or acceptable is greater than that which would otherwise result, even though some temporal segmentation may be present. The amount of temporal segmentation which may appear is a function of frame-to-frame motion, which may be very little in many cases. The illustrated tape speeds are those which are considered to give good results, but other speeds may produce better results. The disclosed system advantageously offers flexibility with respect to choice of speeds in the high speed features operation mode, including speeds which are non-multiples of the number of frames in a GOP.

When presenting a picture at a fast scan speed, a decision must be made about when to present data to the output decoder. Recall that the variable bit length encoded data recovered in a frame time does not correspond to a frame's worth of data. One frame time may contain several B-frame's worth of data or only a fraction of an I-frame's data. The operation of an AD-HDTV decoder or an MPEG decoder takes place in units of pictures and frames. If a frame's time data corresponding to part of an I frame is delivered to a decoder, only part of the picture is produced. To update the entire picture with refresh action, it is necessary to accumulate enough of the bitstream to describe how to make an entire picture. When this information is delivered to the decoder, the corresponding timing cell may be delivered to cause the generation of the frame.

Figure 21:
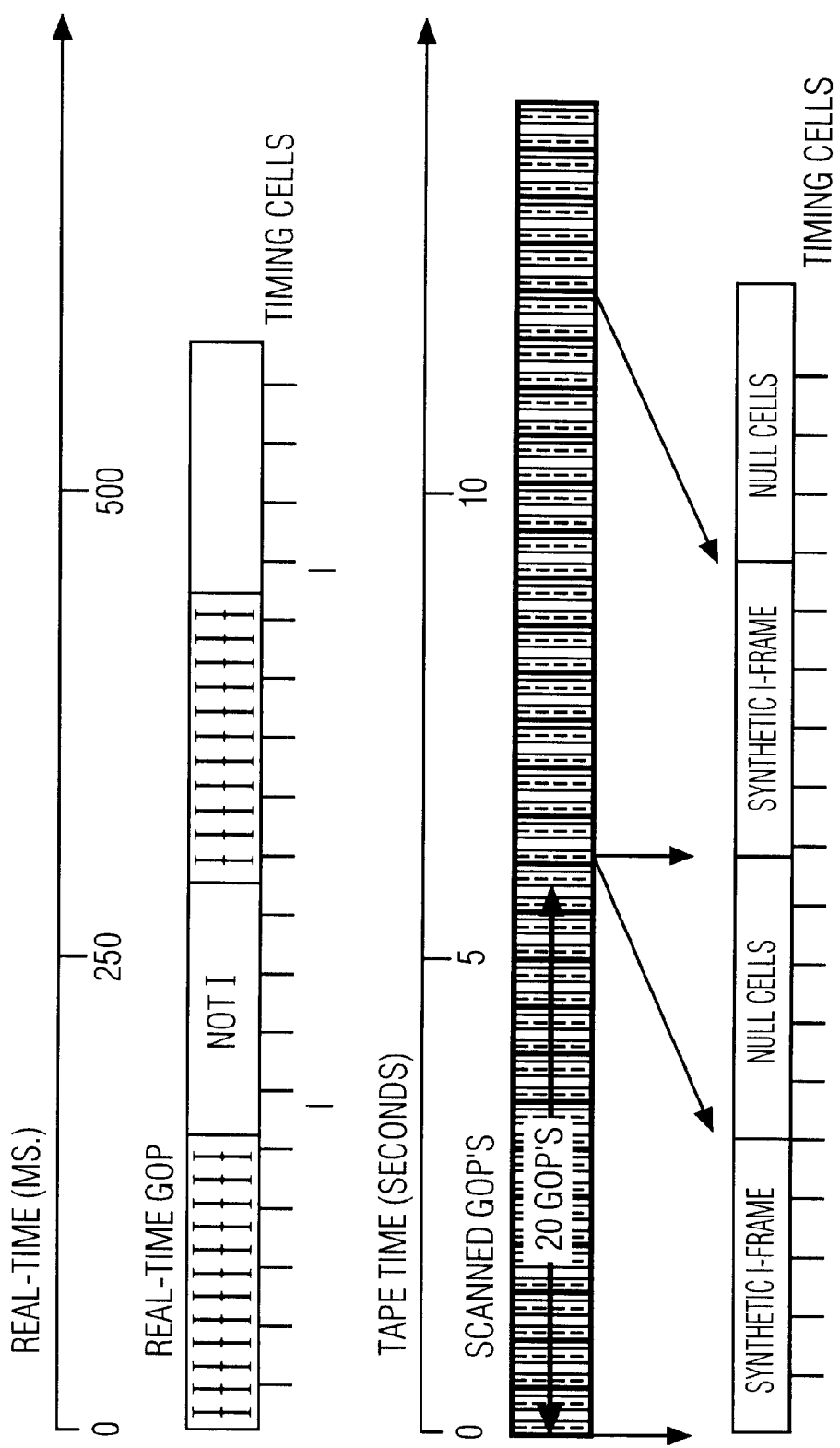
FIG. 21 is a pictorial helpful in understanding the development of output frame data in fast forward reproducing mode.

In the example illustrated by FIGS. 6 and 7, it was assumed that I frame data is the high priority data arranged in the designated HP regions. Since the tape head will recover data from both high and low priority regions at 20× normal speed, the playback data stream (FIG. 7, pictorial C) will include high priority I frame data and low priority B and P frame data. When it is intended to display an image at 20× speed obtained only from I frame information, the tape machine will output only the I frame data (eg., only $I_1$–$I_{13}$ in FIG. 7 (C)). This may be easily accomplished by examining the headers of the playback cells and rejecting all except those cells containing I frame information. Since an I frame encompasses approximately 0.2 seconds, at 20× normal speed the cells from 4 seconds of original video will be collected to produce a 0.2 second collection interval. As noted above, the output will be a series of I frames only in this case, which is illustrated by FIG. 21. In FIG. 21 the upper pictorial represents a portion of data recovered from the tape at 20× speed, shown relative to real time in milliseconds, where only I frame cells are used. The data segments designated "not I" represent rejected low priority data. Thus the upper portion of FIG. 21 corresponds to the output playback datastream shown in pictorial (C) of FIG. 7 with I frame data cells grouped together and B, P frame data cells rejected. The lower pictorial of FIG. 21 illustrates the formation of a synthetic I frame from a composite of data acquired from 20 GOPs, shown with respect to tape speed in seconds (at 20× normal speed). Although the variable length coded bitstream does not necessarily correspond to equal duration pictures, there is a maximum deviation in time of the picture data in the bitstream from the time at which the timing cell causes the generation of the output frame. This maximum time deviation is set by the buffer size, and is typically ¼ second. If the GOP consists of 9 frames, then 20 GOPs at 20× speed are accumulated in 9 frame times (9/30 seconds=0.3 second), and 20 GOPs of data on the tape will have passed in 0.3+0.25=0.45 second. Null cells are inserted in the playback datastream in place of the rejected cells to maintain datastream continuity. A visual presentation in the illustrative I frame only example is a series of still images at a refresh rate likely to be about 3 to 5 frames a second. Each frame is composed of pieces (from macroblocks, through slices to larger pieces) from the corresponding collection interval. Some I frame data may be used in more than one output frame.

Alternatively, a playback output image may be comprised of a composite GOP if all recovered HP frames and SP frames are retained in the output playback datastream (as shown in FIG. 7 (C)). Since a GOP encompasses approximately 0.3 seconds in real time, at 20× normal speed the cells from approximately 6 seconds of original video will be collected to produce a 0.3 second collection interval for a GOP. In this case the 20× playback output is one GOP in which each frame is a composite of the 20 corresponding frames of input. At a 20× scan rate, 20 tape GOPs result in one output GOP. For example, the second B frame ($B_2$) of the 20× playback output is made from the 20 2nd B frames in the sample. An advantage of acquiring a whole GOP in the high speed tape scanning function is that a picture with smoother motion may result due to the presence of spatially coded P and B frame cells, and motion vectors from the P and B frames are likely to be in approximately the correct direction. For example, consider a picture composed of a speaking person in front of a slowly panning background. In the case of fast forward playback using I frame information only, the still parts of the speaker will look good, but the moving parts of the speaker will be somewhat distorted, and the background will appear as a sequence of distorted stills. If the whole GOP is used during playback, the I frame image portions appear about the same, but some blocks of the picture change as other frames of the GOP are displayed. The moving background is likely to remain distorted, but much of the picture moves smoothly in approximately the correct direction.

The implementation of whole GOP scanning uses a constant size interval of interest, which is 9 frames in the case of the AD-HDTV system. If the definition of a GOP changes to other than 9 frames in another system, the programming and operation of an index-index and computer controller (shown in FIGS. 10 and 12) are adjusted accordingly. All GOP frames are used. The start of the interval of interest is the first cell of the I frame beginning the GOP. The sequence of frame types (I, $B_1$, $B_2$, $P_1$, $B_3$, $B_4$, $P_2$, $B_5$, $B_6$) within retreived GOPs is tracked, and cells are sorted within like frames, eg., cells that came from $B_3$ frames are put into the $B_3$ output frame.

The process of redistributing the HP cells during recording involves buffering the cells into cell memory as they are received. A Cell Analysis Processor (as will be described) knows the time sequence of the cells being written to the memory. Specifically, the Cell Analysis Processor monitors the position of a cell in the input data stream relative to the start of a Group of Pictures. This position is encoded in packet headers produced by the tape machine, eg., unit 1016 in FIG. 10. This is accomplished without difficulty since the tape mechanism can maintain a precise count of the tape position in terms of the following factors: hh (hours), mm (minutes), ss (seconds), ff (frame number), tt (track number) and pp (packet number). This information is unambiguous, and is mechanically derived from the head position and the longitudinal timing/sync track on the tape itself. This position information can be represented as a binary value. During the recording process, each cell is associated with a 10-bit linear temporal reference number at the frame rate. When recording, the last picture header processed contains the temporal reference number. This number is temporally stored in the recorder, and recorded in the next tape related header to be written by the tape mechanism. The GOP starting point and its temporal reference are readily determined as noted earlier. As the (AD-HDTV) cells arrive, they are serially numbered within a GOP beginning at the GOP start. This is a 14-bit number. The difference between the linear temporal reference and the 10 least significant bits to the tape position, along with the 14-bit cell serial number, are included in the tape packet header. Any packet, when recovered during the playback process, yields this 24-bit number that can be used to regenerate the exact time of arrival of the cell.

At normal speed playback, the original position of each cell in the datastream is retreived from the tape packet headers. The playback cell datastream can then be rearranged in the original order.

Figure 10:
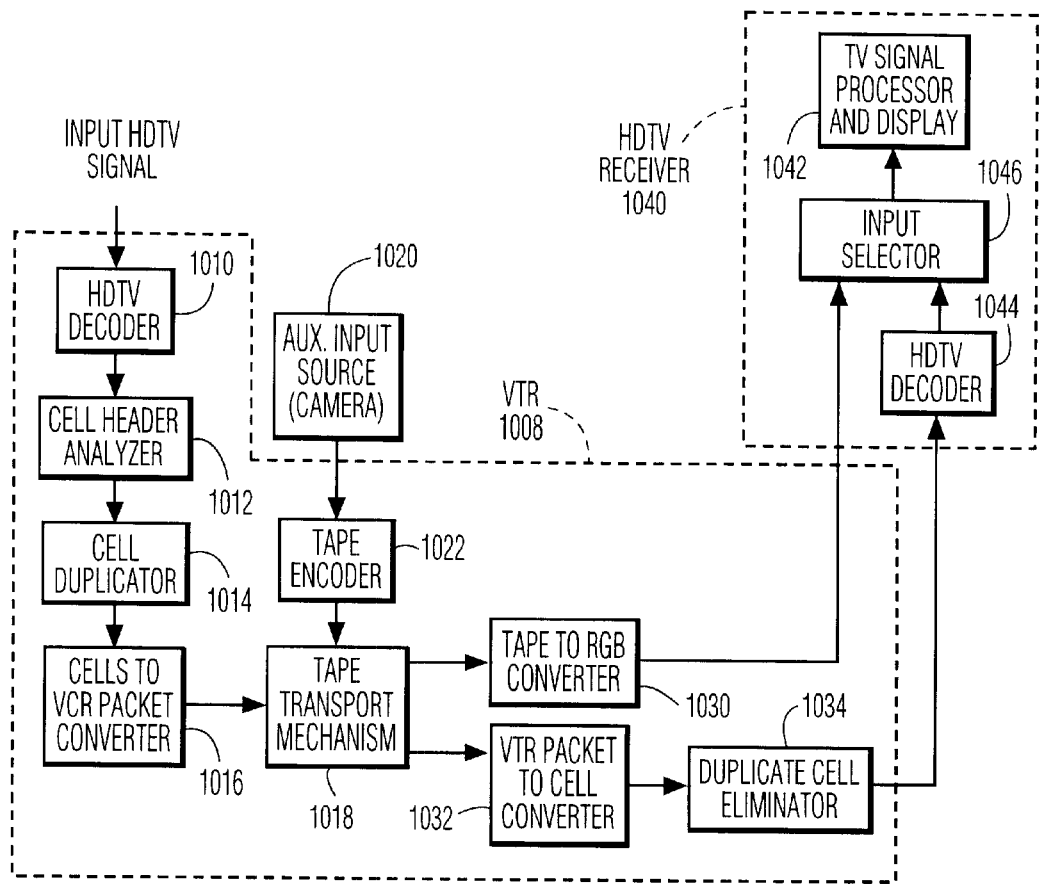
FIGS. 10, 11 and 12 show functional details, in block diagram form, of a cell-level video tape recording/reproducing system employing the invention.
Figure 11:
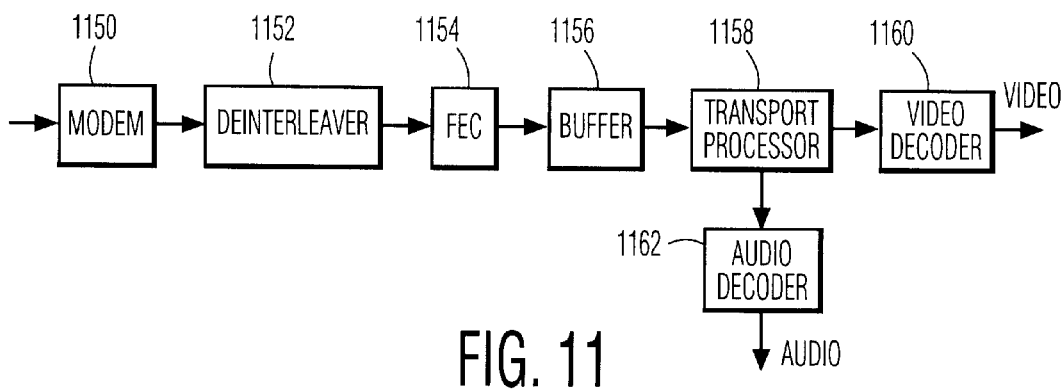

A general arrangement of a high definition video tape recorder/reproducer and a high definition television receiver is shown in FIG. 10. A VTR 1008 receives an input HDTV signal which is decoded by an HDTV decoder 1010. If the input signal is of the AD-HDTV type, decoder 1010 may be arranged as described in U.S. Pat. No. 5,168,356-Acampora, some aspects of which are shown in FIG. 11. Cell header information is analyzed by unit 1012 to obtain data about cell contents including timing and sequence, and high priority cells are duplicated by unit 1014 as an aid to implementing features mode operation. Specifically, selected cells are duplicated in the recorded stream to allow fast scans. In this example, where the AD-HDTV FEC function is included in the tape machine (in decoder 1010, see unit 1154 in FIG. 11), a benefit is obtained that error related overhead does not have to be stored. The extra storage that would have been used for FEC bytes may now be used for redundant (duplicate) cells to make certain information available during a fast search mode. Additional storage capacity beyond the minimum required for the storage of the original bitstream may become available through the process of elimination of FEC data as described above or may become available due to technology improvements in the recording process. This excess capacity is used for the redundant storage of cells to improve fast scan performance. As was described earlier, in the design process, selected scan speeds are mapped to regions on the tape in which the HP data is to be placed. If extra tape capacity is available, the mapping shown in FIG. 6 may be done for additional scan speeds. For example, if an additional scan speed were desired, and data at the new scan speed was not recovered in regions HP2 and HP4, but was recoverable in a region just to the left of HP2 and just to the left of HP4, the HP data that is recorded in HP2 and HP4 could be redundantly recorded in the right ends of regions LP1 and LP2. The displaced LP data from LP1 and LP2 is absorbed in the extra capacity of the media. In the illustrative example described previously, HP cells 1 and 2 were recorded in region HP1, then SP cells 1,2,3,4,5,6 recorded in LP1, then HP cells 3,4 in HP2, & etc. Given extra capacity, the recording pattern is: HP cells 1, 2 in HP1, LP cells 1,2,3,4,5 in LP1, then HP cells 3,4 in a new duplicate region at the end of LP1 and the beginning of HP2, then HP cells 3,4 again in HP2. The pattern where the redundant cells are stored is pre-determined when the tape machine is designed. When playing back at normal speed or 2x, the redundant cells are recovered. From the position along the scan, these cells are known to be redundant, and are discarded.

Cells are converted to tape packets in unit 1016, eg., by means of 8:14 modulation whereby 8 bits words are converted to 14 bit codewords for bit rate reduction as known. Tape packets typically include a header component, an associated data component and timing/synchronizing information. Tape packets from unit 1016 are applied to an MPEG-compatible signal input of unit 1018 which includes tape signal processing networks and a tape transport mechanism. A non-MPEG auxiliary input of unit 1018 receives encoded tape packets from an auxiliary source 1020 (eg., a video camera) via a non-MPEG spatial information tape encoder 1022. Tape output signals from unit 1018 are provided to a unit 1030 which adaptively converts MPEG or non-MPEG output signals to a standard RGB (Red, Green Blue) color television signal format in responsive to a flag bit in the datastream, and to a unit 1032 which converts the tape packets back to the cell format of the input datastream. Duplicate HP cells are eliminated by unit 1034 to provide an output signal datastream of the format expected by the AD-HDTV decoder 1044 of television receiver 1040.

Standard RGB output signals from unit 1030 are applied to one input of an input signal selector 1046 of HDTV receiver 1040. The cell format output signal from unit 1034 is decoded by HDTV decoder 1044 at an input of receiver 1040 before being applied to another input of selector 1046. Selector 1046 provides either RGB format signals or decoded AD-HDTV cell format signals to video, audio, sync, etc. television signal processing and reproducing/display circuits 1042 of receiver 1040.

FIG. 11 shows HDTV decoders 1010, 1044 of FIG. 10 in greater detail. A received input signal is detected by modem 1150, which provides an output signal to a de-interleaver (de-scrambler) 1152 and a Reed-Solomon forward error correcting (FEC) decoder 1154. The corrected signal is applied to a rate buffer 1156 which receives data at a variable rate commensurate with the requirements of subsequent decompression networks in video decoder 1160. A transport processor performs the inverse of a data packing and prioritizing operation performed at a receiver, and additionally performs a degree of error detection in response to parity check bits included in the transport packets. Transport processor 1158 provides output video and audio signals to video transform decoder/decompressor 1160 and audio decoder 1162, respectively, which provide audio and video output signals with a cell format including data and header components. In an AD-HDTV system as described in U.S. Pat. No. 5,168,356-Acampora, the modem provides two output signal associated with HP and LP channels, and the de-interleaver, FEC control and buffer functions are duplicated for both the HP and LP channels.

Figure 12:
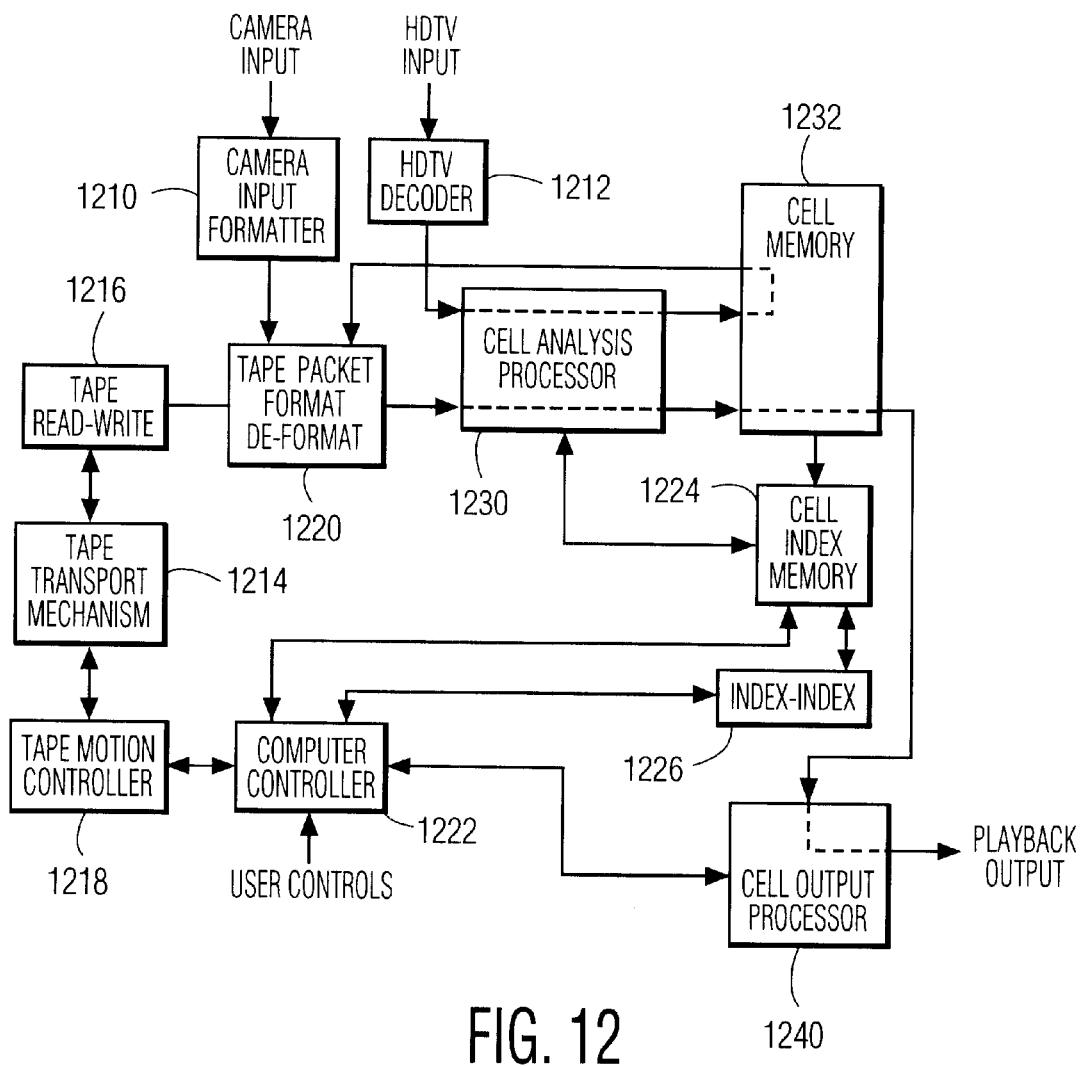

FIG. 12 shows a more detailed block diagram of a video tape recording/reproducing device capable of operating at the data cell level. The system of FIG. 12 includes a computer controller 1222, ie., a microprocessor, capable of making the many decisions that must be made at a packet/cell rate. Controller 1222 interacts with a database including cell buffer memory 1232 containing data read from the tape, and the controller maintains an index 1224 of the buffer contents. For each cell, the index contains information pertaining to cell location in the buffer; cell starts at the tape reference time indicated by factors hh, mm, ss, ff, tt, pp (described previously); cell error status; cell service type (eg., audio or video) including HP/LP indicators; cell frame number; cell frame type; and information translating between the tape temporal reference and, for example, the AD-HDTV linear temporal reference. The last mentioned item can be generated at the time the tape is written to, and indicates which timing packet's domain a data cell belongs to. Additional indexed information may include indicators such as an indicator indicating the validity of the next cell in sequence, a duplication indicator showing that a cell has been duplicated elsewhere, and a duplication index pointer indicating the index location of the duplicated cell.

The index may contain as many as 13,000 entries (the word size of the largest GOP). The size of an index entry is about 80 bits, producing a storage requirement of about 128 KBytes for the index. In addition, as an aid to controller 1222 in using the index, an index-index 1226 is also maintained. The index-index contains pointers to frame boundaries within the index.

More specifically, in FIG. 12, a camera input formatter 1210 converts an analog RGB color video signal to digital form during recording. Another block, not shown, performs the inverse function for playback. Tape read-write unit 1216 performs bit level modulation/demodulation during recording/playback, eg., using 8:14 modulation, as known, to convert an eight bit data word to a 14 bit codeword to achieve bit rate reduction. Tape motion controller 1218 contains capstan and tracking controls, and provides controlled acceleration starts and stops. In combination with unit 1216, unit 1218 manages the time-code function. Unit 1218 determines which track is being read, and responds to instructions to go to and pause at a specified track, and to begin playing at a given track at a certain speed, for example. Tape packet format/deformat unit 1220 creates and formats tape packets, creates or decodes tape packet headers, and performs Forward Error Control and Cyclical Redundancy Checks as well as providing error indications. HDTV decoder 1212 operates as described in FIGS. 10 and 11 and provides an output cell stream including data bytes as well as information such as start-of-cell information, error flags, and a byte clock.

Cell analysis processor 1230 generates read/write addresses and provides data to cell memory 1232. In the recording mode, processor 1230 examines packet headers and timing packets and temporal references such as may be provided in the datastream of an AD-HDTV signal, for example. Processor 1230 additionally maintains a GOP and frame count, a linear temporal reference for determining frame display, pointers to previous GOPs and frames, a tape packet record index indicating exactly where a packet should be recorded, and also controls the delivery of duplicate HP cells to packet format unit 1220. During the playback process, unit 1230 fills cell memory 1232 with data cells, scans the data stream and cell headers in particular, creates a cell index entry for each cell and maintains a GOP and frame sequence state. In addition, unit 1226 index-index entries are created at appropriate times to designate significant occurrences such as GOP boundaries, frame boundaries and timing packets in the datastream.

Cell memory 1232 is sized to accomodate a GOP, receives cells read from analyzer 1230 and writes output cells to packet formatter 1220 at a port speed of about 3 MBps. Cell index memory 1224 writes entries while analyzer 1230 is filling cell memory 1232. Index memory 1224 comprises the address function of controller 1222. Index-index 1226 is associated with memory 1224 and contains pointers to frame boundaries within index 1224, as will be seen in connection with FIG. 17.

Cell output processor 1240 generates read addresses for cell memory 1232 and provides output cells from cell memory 1232 under control of controller 1222 during the playback mode. A FIFO buffer in output processor 1240 is loaded with addresses and instructions from controller 1222. Under control of unit 1222, some data passes from memory 1232 to the output of output processor 1240 without alteration, while other data may be altered (eg., service type sequence counts, timing cells and temporal reference data).

Computer controller 1222 implements various features such as Fast Forward, Slow Motion and Freeze Frame in response to input user control signals (eg., from a user interface such as a remote control unit) by communication with cell analysis processor 1230, cell output processor 1240 and tape motion controller 1218 via flags, buffers and registers as appropriate. Controller 1222 processes about 30,000 cells/second and exhibits about 33 microseconds/ decision, on average.

Figure 13:
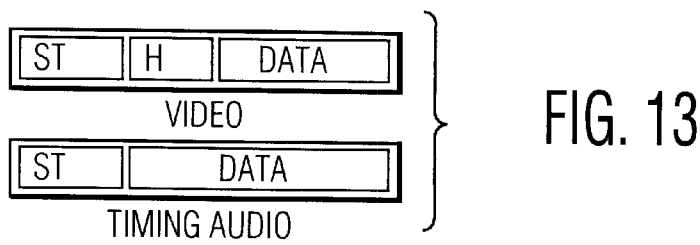
FIGS. 13–16 illustrate aspects of data cells processed by tape recording/reproducing apparatus according to the invention.
Figure 14:
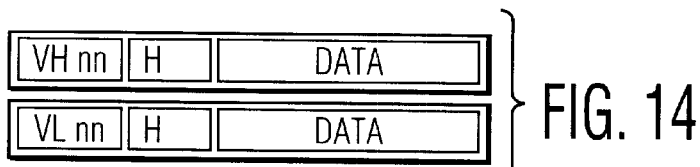
Figure 15:
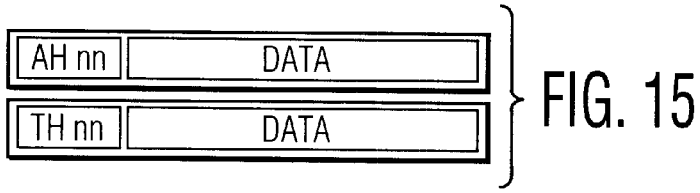

Following is a more detailed description of the information processed by cell memory 1232 and cell index memory 1224. Units 1224 and 1232 process two basic types of cells from which FEC and error detection data have already been removed. These cells are video cells, and timing and audio cells as shown generally in FIG. 13. In these cells ST designates the Service Type code portion (video, audio, timing), and H designates the Header portion. Every cell begins with a Service Type byte. In addition to the type identification (video, audio, timing . . . ) the byte contains a four-bit cyclical continuity count, ie., a Service Type Sequence Number. The continuity count must be cyclical within each service type. If not, the associated cell is assumed to be an (otherwise) undetected error, eg., a lost packet. The Sequence Number also indicates an incorrect service type, such as if audio and video types are interchanged. Timing and audio cells have no specific header in this example. As illustrated by FIG. 14, the Service Type is a Byte indicating high priority video VH or low priority video VL. Similarly, FIG. 15 illustrates the Service Type byte indicating audio (always high priority) AH, and a timing cell TH (always high priority). Numbering is indicated by the symbol "nn." In video cells, the header contains a 5-bit frame number for aligning datastreams. In the AD-HDTV system, there is one HP cell for every four LP cells. Usually the HP cell is video, occasionally. the HP cell is audio, and once a frame the HP cell is a timing cell.

Figure 16:
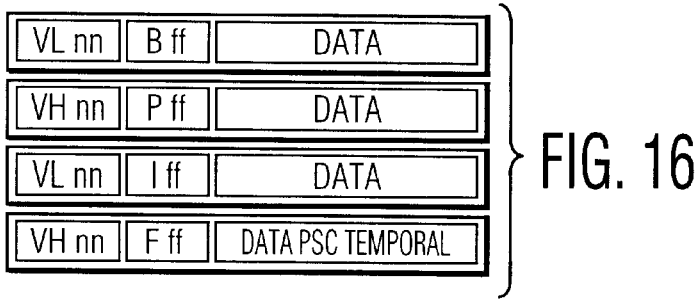

There are four types of video headers, as shown in FIG. 16. VH and VL designate high and low priority video components as discussed. B, P and I designate the frame components of a GOP. F designates a special case I frame, which is a high priority I frame containing the beginning of a frame at Slice 0. This cell starts with a Picture Start Code (PSC), which is followed by a temporal reference for the new frame. The symbol ff indicates the frame number. In the playback mode, cell memory unit 1232 is loaded as a ring buffer. Somewhere in the memory is the beginning of a GOP. This GOP boundary is defined as the first HP or SP cell designated by Frame Type F.

Temporal reference information, eg., 10-bit information, is sent via the datastream timing packets to establish a flywheeled local linear temporal reference which determines which frame to display and when. The Temporal Reference also appears in the HP data following an MPEG Picture Start codeword, and can be recovered as the 10 bits immediately following the Picture Start codeword in a frame type "0" HP cell.

Figure 17:
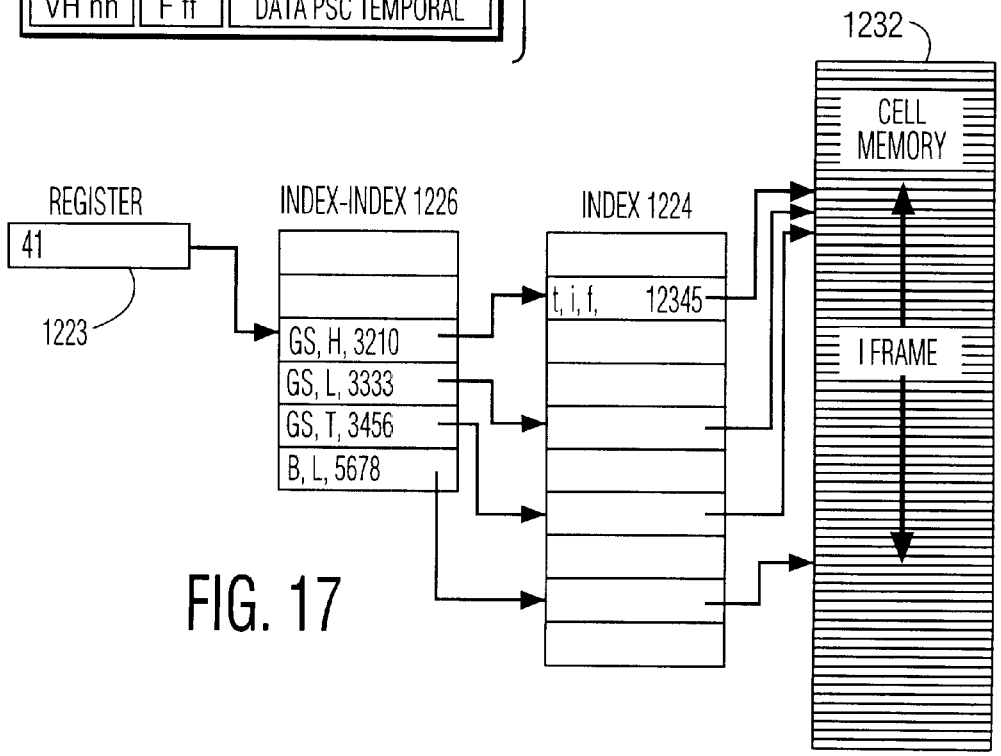
FIG. 17 shows details of the operating structure of a portion of the system shown in FIG. 12.

FIG. 17 illustrates the process by which cell memory data is accessed in the system of FIG. 12. While putting cells into memory 1232, cell analyzer 1230 has also filled in the cell memory index of unit 1224. When cell analyzer 1230 sees a GOP start, or other significant information, it also fills in entries in Index-index 1226. For example, when a GOP start is present, a register 1223 in computer controller 1222 indicates that location (address) 41 of Index-index 1226 is a GOP start. Register address 41 indicates that this GOP start (GS) is high priority (H) and that its index location (address) is 3210. That index location contains an entry indicating that the corresponding tape location ("i") is 4 minutes, 7 seconds, 9 fields, 2 tracks, 0 packets, and that the temporal reference ("t") is 222, for example. Flags ("f") may indicate that there are no errors, that the next cell is also good, etc. Finally, the index location indicates that the actual data for the cell is located at address "12345" in the cell memory. The next Index-index entry indicates that the entry for the Group Start, low priority information (GS, L) is at index location 3333. The following Index-index entry indicates that the entry for the timing cell for this Group Start (GS, T) is at index location 3456. The next entry is for a low priority B frame (B, L).

Another approach to implementing features functions is recording at the level of MPEG codewords. In this example, this approach is based upon decoding an input AD-HDTV datastream to the level of a single stream of MPEG codewords. Specifically, it is herein recognized that in the interest of efficiency, only useful spatial information should be used/duplicated. Spatial and non-spatial information can be separated much more easily in an MPEG codeword datastream than in an AD-HDTV datastream. MPEG-level processing advantageously uses spatial slices, and slices containing significant numbers of spatial macroblocks result in smoother scan presentations.

Therefore, according to this approach, an input digital datastream is decoded to a datastream of MPEG codewords. These codewords are then separated into codewords representing spatial and non-spatial information, and certain separated spatial codewords are placed into tape data packets. The tape data packets are replicated as required, and the spatial packets are recorded where a scanning head will recover the spatial information at tape speeds greater than normal, such as fast search speeds. Audio information is separated from video and processed separately, and is applied to a dedicated audio input of an HDTV receiver.

Figure 22:
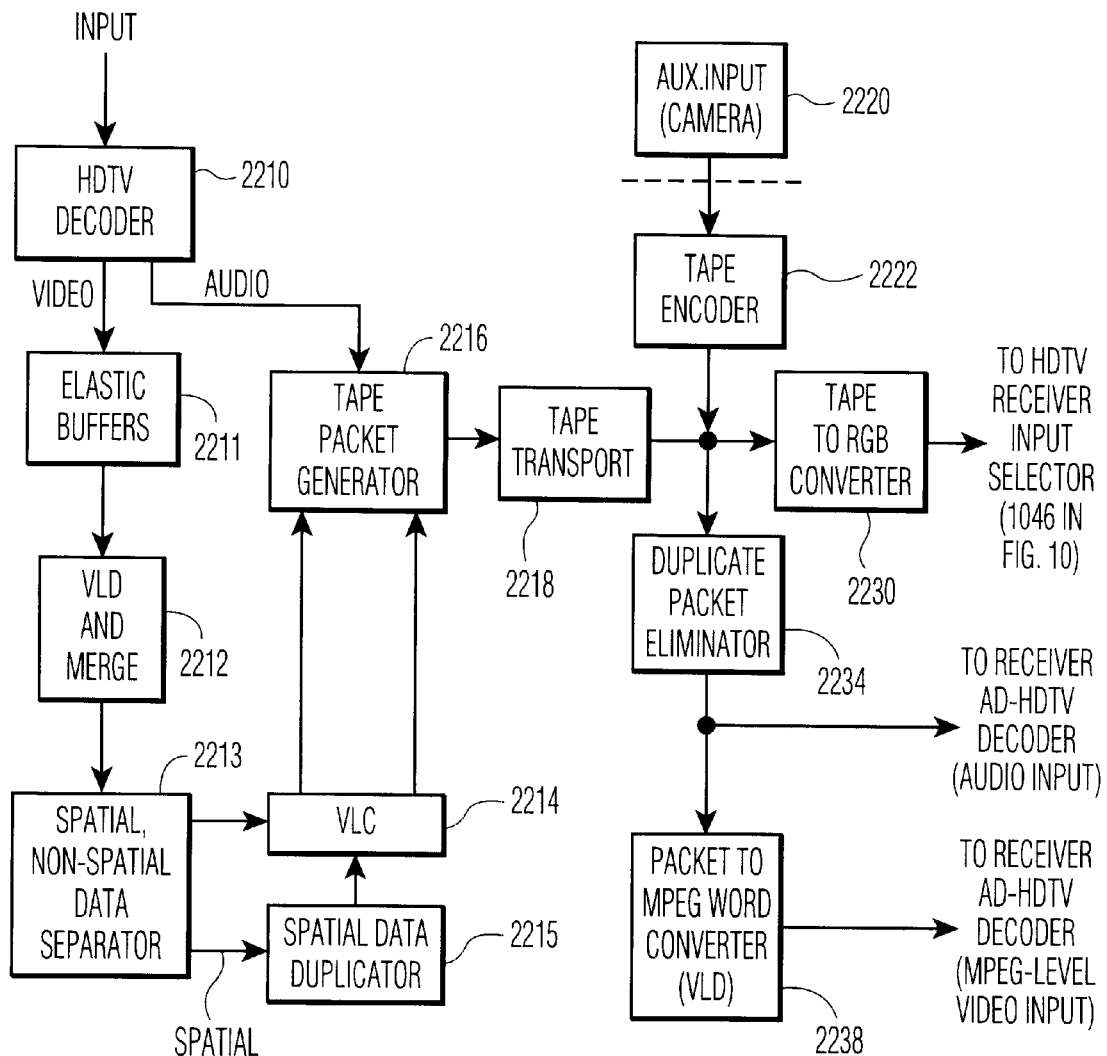
FIGS. 22 and 23 show functional details, in block diagram form, of an MPEG-level video tape recording/reproducing system employing the invention.

A general arrangement of a high definition video tape recording/reproducing device using this approach is shown in FIG. 22. Elements 2210, 2218, 2220, 2222, 2230 and 2234 are similar to units 1010, 1018, 1020, 1022, 1030 and 1034, respectively, of FIG. 10. In FIG. 22, HP and lower priority SP video information at a video output of AD-HDTV decoder 2210 is stored in an elastic buffer 2211 before being variable length decoded into MPEG codewords and merged into a single datastream of MPEG words in a unit 2212. The MPEG word datastream is separated into spatial and non-spatial data by a separator 2213, which accomplishes this by examining codeword identifiers. Non-spatial codewords are applied directly to a variable length coder 2214 (ie., a data compressor) to facilitate the subsequent recording process in unit 2218. Spatial codewords are duplicated by a unit 2215 before being VLC coded by unit 2214. Only important spatial data is duplicated by unit 2215, since there is a large amount of spatial data. For example, a complicated still picture may comprise 75% or more I frame data. Thus the spatial data is prioritized. Spatial slices for an I frame are considered important and are duplicated, and certain B and P frame spatial slices may be duplicated. For B and P frames, if a prescribed number of slices are found to be intracoded (eg., based on adaptive weighting factors as a function of picture complexity), the slice is considered to be spatial.

Figure 24:
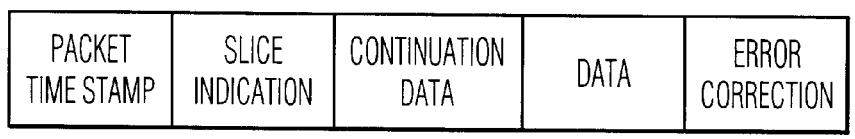
FIG. 24 illustrates the general configuration of a tape packet locally generated by the recording/reproducing system.

VLC spatial and non-spatial data outputs of compressor 2214 are applied to respective inputs of a tape packet generator 2216, another input of which receives variable length coded audio representative words from an audio output of AD-HDTV decoder 2210. FIG. 24 is a general representation of the tape packet format. The tape packet header contains fields indicating a time stamp within the original datastream (eg., indicating hours, minutes, seconds and frame number of associated data), the slice number of the data (eg., slice 50, I frame), and continuation data, a data section containing specific slice data including starting bit and ending bit information for example, and an error correction section containing FEC and CRC error detection and correction information, for example.

Continuing with FIG. 22, a tape packet datastream from unit 2216 is recorded via tape transport and servo unit 2218, which includes recording and playback mechanisms and electronics. An output signal is applied via a converter 2230 to an HDTV input selector as discussed in connection with FIG. 10, and also to a unit 2234 which eliminates duplicte HP cells generated by unit 2215. An output signal from unit 2234 is provided to an audio input of a decoder in the HDTV receiver. The output signal from unit 2234 is processed by a unit 2238 which converts the datastream from tape packets back to MPEG words and variable length decodes these words. MPEG words from an output of unit 2238 are applied to an MPEG-level video input of an HDTV receiver decoder.

During playback/reproduction, the data recovered from the tape is in the form of tape packets containing variable length coded MPEG words. Merging the duplicated data into a useful MPEG datastream is facilitated by the information contained in the tape packet headers, indicating a time stamp within the original datastream, the slice number of the data and continuation data. As each packet is read by unit 2238, the data is converted from variable length code to words and is stored in memory (eg., unit 2332 in FIG. 23). An index (eg., unit 2324 in FIG. 23) is filled with packet header information. A computer controller (unit 2322 in FIG. 23) decides which blocks of MPEG words are to be delivered to form the output MPEG word datastream.

Figure 23:
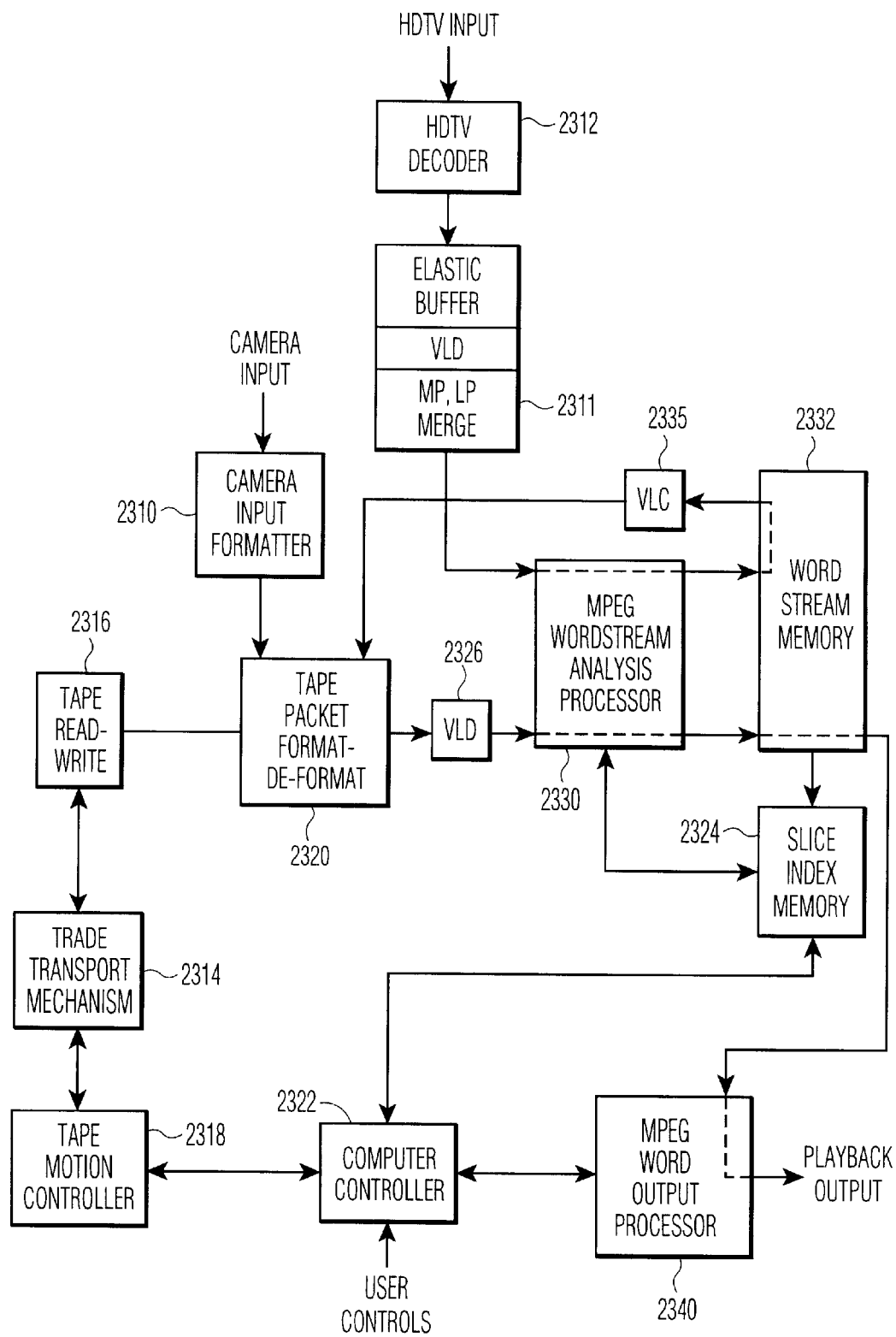

The basic elements of an MPEG-level tape machine are shown in FIG. 23. Elements 2310, 2312, 2314, 2316, 2318, 2320, 2322, 2324, 2330, 2332 and 2340 are similar in operation to elements 1210, 1212, 1214, 1216, 1218, 1220, 1222, 1224, 1230, 1232 and 1240 in FIG. 12, respectively. Unit 2311 corresponds to units 2211 and 2212 in FIG. 22. The elastic buffer in unit 2311 is resilient enough to allow a reasonable rate of variable length coding. Timing cell data are translated to a local frame timing signal. Variable length coder 2335 (eg., a ROM) compresses the MPEG bitstream for storage efficiency, using standard MPEG code tables. Variable length decoder 2326 subsequently undoes this coding. Decoder 2326 may be implemented by the decoder (VLD) in unit 2311 since recording and playback are not simultaneous.

Memory 2332 stores a GOP worth of MPEG codewords. Analysis processor 2330 writes data while output processor 2340 reads data. MPEG word analysis processor 2330 generates read/write addresses for word memory 2332. During recording, processor 2330 looks for Slice Start codewords in the wordstream, counts all spatial macroblocks, allocates duplicate slices, and delivers duplicate slices for recording. During playback, processor 2330 fills word memory 2332, scans tape packet headers, and creates a slice index entry for each cell Slice index memory 2324 receives data from analysis processor 2330 while processor 2330 is filling word memory 2332. This memory is seen by computer-controller 2322.

Output processor 2340 generates read addresses for memory 2332 during playback, based upon the contents of slice index memory 2324 and indices generated by controller 2322. Controller 2322 loads a FIFO memory in output processor 2340 with address information and functional commands, and in the playback mode controller 2322 provides slice indices to output processor 2340. Output processor 2340 generates MPEG stream levels above slice level and an output codeword stream including a frame synchronization signal.

The operation of the MPEG-level system at slow features speeds is generally similar to that previously described in connection with the cell-level system. Briefly, a GOP of data is held in word memory 2332. When the user (or a timer) calls for the next frame, it is produced from the memory if possible. If such data is not in memory, the tape is caused to move to acquire the needed GOP data. Data to be output to the receiver is repetitively played from memory. With this approach, frame synchronization is accomplished with a locally developed signal delivered at the start of the data for each frame. The words for an output frame are all delivered within the frame time.

For fast features operation, the word memory is filled with data. Slice index 2324 contains information bits indicating if an entire slice was acquired (and if so, which slice), if the start of a slice was acquired, or if only the end of a slice was acquired. Controller 2322 rearranges the slices to form frames based upon an examination of the contents of index 2324. Valid slices are delivered by output processor 2340 under control of controller 2322.

The operations performed by the tape machine in the special features mode can be enhanced and assisted by the use of "feature (control) bits." These bits may be advantageously incorporated in the headers of the data cells of the AD-HDTV system, for example. These bits may be responded to at the television receiver to perform a given feature function by operations performed largely or entirely at the receiver, rather than at the tape machine. The AD-HDTV data format, as described previously, includes timing cells. These timing cells indicate to the decoder when to decode a specific frame. The timing cells contain the temporal reference that indicates which frame is to be decoded at the time that the timing cell arrives. There is room in the timing cell for extra information. It is in the timing cell that the extra feature bits are inserted. As the decoder requires a timing cell to decode a picture, the feature bits are available to the decoder when the picture is to be processed. The control computer 1222 in FIG. 12, in response to user controls, is aware of which modes the tape machine is operating in. The control computer loads a register in the Cell Output Processor, 1240 with the values of the feature bits to be inserted in a known position in the timing cells to be produced.

A bit field may be introduced indicating and instructing a receiver to "Show the Last Frame Again." In some AD-HDTV receivers the last frame is the past (I or P) anchor frame. In other receivers, the last frame is the last frame displayed. Another bit may represent an instruction to "Decode But Don't Play." In some receivers this bit may have the effect of leaving the last frame displayed in the output buffer while generating new frames. A further bit may represent an instruction to "Accept This Frame." This instruction may be intended to accept a given frame even if it is out of an expected temporal sequence. This action would begin at the next MPEG Picture Start Code (which precedes a frame) temporal reference in the datastream that matches this timing cell temporal reference. The combination of this bit and the "Show Last Frame Again" bit may be used by a receiver to generate a new frozen frame. Another bit, "Ignore Input Data," may be used to ignore input video data for a given frame, leaving the current state unchanged (anchor frames, motion vectors, error concealment memory, etc.), and to disable sequential checks for data consistency. Other features bits may represent instructions to permit normal audio reproduction, to mute the audio completely, or to mute the audio selectively when there are excessive data discontinuities to avoid unpleasant sounds.

In a slow-speed playback features mode, the tape transport mechanism may be required to exhibit shuttle-like movements, passing over certain tape tracks before data is needed. The playback electronics include buffer memory large enough to hold a GOP of input data and a frame of output data for output. This is not an unreasonable amount of storage as the data is compressed at this point. Appropriately controlled tape acceleration can be achieved with currently available tape transports and controllers. An exemplary sequence of operations follows.

With the tape moving forward at normal speed, the cell buffer memory cycles through its capacity (memory addresses), storing the current GOP as it is written to the buffer. The tape machine features controller (eg., unit 1222 in FIG. 12) is aware of the current position in the datastream of tape packets, and of the corresponding current position in the input AD-HDTV datastream. This information is conveyed by GOP and frame number, picture header temporal reference for the MPEG bitstream, timing cell temporal reference information from the AD-HDTV datastream, and sequence counters for all service types. All such information is contained in the headers inspected by the features controller.

When the viewer activates a "Freeze" tape control, the tape mechanism continues to read through the current GOP, filling the buffer memory with an entire GOP worth of cells. The tape controller locates the GOP boundary in term of cells by scanning HP video cell headers for frame type 0 while buffering LP data in memory, and noting the associated frame number. The stored LP cell headers are then scanned for frame type 0 with a matching frame number. The associated current timing cell temporal reference ("linearized" to indicate the established frame display order) determines the frozen frame. Other timing cells in the header are replaced by the features controller, with timing cells containing feature bits indicating that the following functions are to be performed: Freeze frame, Ignore other inputs, and Mute audio. The features controller replaces further video cells with null cells while the Freeze frame feature persists. The insertion of null cells into the datastream during the freeze frame mode advantageously avoids the need to stop and start the datastream, thereby avoiding timing and synchronizing problems. In the replacement null cells, the associated Service Type Sequence Number in the header is generated sequentially by the features controller to validate the datastream with the replacement cells. This Sequence Number is used in the AD-HDTV system, for example, to aid in discovering lost or erroneously positioned packets, or interchanged service types.

The tape drive transport mechanism, having read to the end of the GOP, gently slows down the tape, backs up slightly, and prepares to resume reading the tape packets for the next GOP. At this point the user is still seeing the frozen frame display. At this time likely user instructions include Next Frame, Previous Frame, or Play.

If the user requests the next frame, the following steps occur. If the next frame is not in memory, the tape moves forward. The first frame written into buffer memory is the I frame at the beginning of the next GOP, after which the following B and P frames are written to the memory whereby the buffer contains the entire new GOP. Video service type cells for the next frame are transmitted in order to the receiver. Again, video cells not within the next frame are replaced by null cells. The timing cell corresponding to the next frame may or may not be in the cell buffer. If the features controller senses that it is in the buffer, it is altered by the controller to match the artificial timing and sequencing being generated by the tape machine. If it is not in the buffer, the (timing flywheel in the) tape machine causes a timing cell to be generated. This timing cell contains an "Accept This Frame" features bit and a "Show Last Frame Again" features bit, which cause the receiver to update the displayed picture by showing the last frame.

If the user requests the previous frame, the following steps occur. The features controller knows which anchor frames are stored in the receiver. If the requested previous frame can be generated from the existing anchor frames stored in the receiver and from the input data for the requested frame (ie., the requested frame is a B frame following a P frame in transmission order), the cells to update the receiver display are produced using the procedure described in the preceding paragraph. If the requested frame is an I frame, a P frame, or a B frame following an I frame, the tape is caused to reverse and play the entire preceding GOP.

The table shown in FIG. 20 indicates the frame dependencies for stepping the tape forward and backward. In this table, the "transmission order" row indicates what is recorded on tape as appearing at the output of the video tape machine. Assume that the GOP consisting of frames 9 through 14 is the GOP in buffer memory. The "displayed frame" row indicates which frame could be displayed at the time the transmitted frame is available. B frames are displayable when they arrive, and anchor frames (I and P frames) are displayable three frames after they arrive.

In the following examples assume that, when the tape is stepped forward, the GOP consisting of frame 9 through frame 14 has just been read from the tape. To display frame 6, frame 6 alone is required, and it is already in the receiver's anchor frame memory. The receiver always stores two anchor frames to be able to create a B frame. Frame 9 is delivered and frame 6 is displayed. One more forward step requires the data for frame 7 and for anchor frames 6 and 9, which are available in the receiver's frame memory.

When stepping backward, assume that the same GOP resides in cell buffer memory (unit 1232 in FIG. 12). The first frame to be displayed is frame 14. The previously displayed frame was frame 15, so frame 15 is assumed to be in receiver memory. Frame 14 requires data from anchor frame 12, and frame 12 requires data from anchor frame 9. The entire GOP must be output to the receiver to prepare the receiver to display frame 14.

Stepping back to frame 13 and then to frame 12 is less difficult, since the required anchor frames are already in receiver memory. Frame 11 requires replay of the GOP to put frame 9 into the receiver. Frames 10 and 9 follow easily. Stepping back to frame 8 initiates a cascade. Frame 8 requires anchor frame 6, which isn't in receiver memory, and frame 6 is not in the current GOP in the tape machine's cell buffer memory. Frame 6 requires frame 3, which requires frame 0. Thus the entire previous GOP (frames 0–8) must be read from the tape. Accordingly, frames 0 and 3 are delivered to the receiver as anchor frames. Frame 6 is then delivered to the receiver, with frames 3 and 6 now being anchor frames. The GOP containing frames 9–17 is then re-acquired by going forward with the tape and storing it in the cell memory, and frame 9 is delivered to the receiver. Frames 6 and 9 are now the anchor frames, whereby frame 8 may be generated and delivered to the receiver.

The time to respond to a user requested step may vary, depending on the type of frame which is requested. For some frames, for which information is available in buffer memory, a new picture can be generated and presented almost immediately, eg., in approximately 33 milliseconds. The cascade example described in the previous paragraph takes considerably more time, since that example involved repositioning the tape to the beginning of the previous GOP (100 ms.), reading the previous GOP while delivering frames 0, 3 and 6 (300 ms.), reading frames 9, 7 and 8 (½ GOP time, 150 ms.), and presentation time (33 ms.), for a total time of about 600 ms. This is not unreasonably long for a user response time.

Other slow-speed user features, such as slow motion and reverse, can be treated as a predictable series of still ("freeze") frame steps. These steps are advantageously undertaken at the receiver in response to information, such as the feature bits described previously, provided to the receiver by the tape machine. Thus, for example, it is the receiver which generates a freeze-frame display using its internal memory and HDTV processing/decoding circuits in response to a control bit provided by the tape machine in response to a user control request. Slow rates can be obtained by stepping and then repeating frames as often as necessary to maintain a smooth rate.

The previously mentioned AD-HDTV system, sometimes referred to as the ADTV system, has been submitted to the FCC/ACATS for on-going testing and analysis by the Advanced Television Test Center (ATTC).

What is claimed is:

1. A video recording/reproducing (VRR) system for processing a digital enhanced definition television signal, comprising input means for receiving a digital datastream containing video information;

recording/reproducing means responsive to said datastream;

output means responsive to a transduced signal from said recording/reproducing means for conveying information including transduced video information to a video device suitable for processing and displaying television-type information, when present;

feature control means, responsive to user input control, for generating VRR video feature control data to determine the operation of said video device such that, in response to said feature control data being provided from said VRR system to said video device when present, at least one VRR video feature function is performed in whole or in part by said video device; and means for conveying said feature control data to said output means.

2. A system according to claim 1, wherein said feature control data represents an instruction to perform at least one of the following functions: (a) repeat the display of a video image frame to produce a freeze-frame image; (b) decode but not display a video image frame; (c) accept an out-of-sequence video image frame; (d) ignore predetermined data for a given video image frame; and (e) mute audio information.

3. A video recording/reproducing (VRR) system for processing a digital enhanced definition television signal, said system exhibiting special features operation in accordance with a method comprising first and second operating modes including the steps of, for a first mode:

(a) receiving a digital video information datastream comprising an input arrangement of video data;

(b) altering said data arrangement so that prescribed video data, when recorded at a given speed, appears in predetermined regions of tape tracks as a function of a tape scanning path a recording/reproducing head of a recording/reproducing transducing device is expected to travel at a speed greater than said given speed in a special features operating mode;

(c) recording said datastream with said altered data arrangement; and (d) conveying information including transduced information from said recording/reproducing device to a video device suitable for processing and displaying television-type information, when present; and a second mode including the steps of (e) generating VRR video feature control data in response to user input control to control the operation of said video device such that, in response to said feature control data being provided from said VRR system to said video device when present, at least one VRR video feature function is performed in whole or in part by said video device; and (f) conveying said feature control data to said video device when present.

4. A method according to claim 3, wherein in said first mode said given speed is a normal recording speed;

said step (b) special features operating mode is a fast search mode;

said datastream comprises MPEG coded image representative information including intracoded "I" picture frames;

said prescribed video data is intracoded "I" frame information;

said feature performed in step (e) is a freeze-frame feature; and said video device is a television signal receiver.

5. A video recording/reproducing (VRR) system for processing a digital enhanced definition television signal, said system exhibiting special features operation in accordance with a method comprising the steps of:

(a) generating VRR video feature control data in response to user input control to control the operation of a video device suitable for processing and displaying television-type information such that, in response to said feature control data being provided from said VRR system to said video device when present, at least one VRR video feature function is performed in whole or in part by said video device; and (b) conveying said feature control data to said video device when present; wherein generating step (a) comprises the step of generating a freeze frame display using local memory associated with said video device.

* * * * *